(12) United States Patent
Wakai et al.

(10) Patent No.: US 6,925,600 B2
(45) Date of Patent: Aug. 2, 2005

(54) INFORMATION PROCESSING APPARATUS FOR STORING PROCESSING HYSTERESIS DATA, AND METHOD THEREFOR

(75) Inventors: Masanori Wakai, Tokyo (JP); Masayuki Takayama, Kashiwa (JP); Aruna Rohra Suda, Yokohama (JP); Suresh Jeyachandran, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/038,983

(22) Filed: Mar. 12, 1998

(65) Prior Publication Data

US 2002/0052907 A1 May 2, 2002

(30) Foreign Application Priority Data

Mar. 14, 1997 (JP) ............................................. 9-060852

(51) Int. Cl.[7] .............................................. G06F 15/00
(52) U.S. Cl. .............................. 715/530; 707/3; 358/1.1
(58) Field of Search ........................ 715/530; 707/1–3, 707/10; 358/1.1; 718/100; 719/320; 709/100–108, 300

(56) References Cited

U.S. PATENT DOCUMENTS

| | | | | |
|---|---|---|---|---|
| 5,504,880 A | * | 4/1996 | Hirosawa et al. | 709/224 |
| 5,678,042 A | * | 10/1997 | Pisello et al. | 714/47 |
| 5,722,999 A | * | 3/1998 | Snell | 607/32 |
| 5,727,129 A | * | 3/1998 | Barrett et al. | 706/10 |
| 5,786,814 A | * | 7/1998 | Moran et al. | 345/328 |
| 5,884,312 A | * | 3/1999 | Dustan et al. | 707/10 |
| 5,918,222 A | * | 6/1999 | Fukui et al. | 707/1 |
| 6,018,342 A | * | 1/2000 | Bristor | 345/354 |
| 6,018,344 A | * | 1/2000 | Harada et al. | 345/357 |
| 6,112,212 A | * | 8/2000 | Heitler | 707/501 |
| 6,112,242 A | * | 8/2000 | Jois et al. | 709/225 |
| 6,185,625 B1 | * | 2/2001 | Tso et al. | 709/247 |

FOREIGN PATENT DOCUMENTS

| | | |
|---|---|---|
| EP | 621 528 A1 | 10/1994 |
| GB | 2 263 988 A | 8/1993 |

OTHER PUBLICATIONS

S. Kochan, et al, UNIX Shell Programming, Hayden Books, pp. 333–347.*

* cited by examiner

Primary Examiner—St. John Courtenay, III
Assistant Examiner—G. L. Opie
(74) Attorney, Agent, or Firm—Fitzpatrick, Cella, Harper & Scinto

(57) ABSTRACT

When an information processing apparatus performs the process, it stores hysteresis data itemizing the process type, the apparatus in charge of processing, the person for instructing the process, the process object information and execution time. Then, necessary hysteresis data are searched for by designating the conditions in the items, desired hysteresis data is selected from the hysteresis data that are found, and the same process (re-printing of the same document) or a new process (saving a printed document with a new file name) is performed for the object in the selected hysteresis data. The hysteresis number is provided for the hysteresis data, and a correlation is provided for the process that caused the process represented by the hysteresis data, and the hysteresis number of the process that is caused by the process represented by the hysteresis data. When a specific hysteresis number is designated for the search for the hysteresis data, it is employed to acquire the hysteresis number for the associated process, and the hysteresis data that has the acquired hysteresis number is also added to be object for a search.

67 Claims, 20 Drawing Sheets

FIG.6A

ORIGINAL HYSTERESIS

| | ACTIVATION CONDITION | TASK CONTENTS | |
|---|---|---|---|
| 3 | NO PROCESSING FOR PREDETERMINED PERIOD OF TIME | MAKE ( OBJECT:IDLE PERIOD OF TIME TASK) | 61 |

FIG.6B ↓

ORIGINAL HYSTERESIS

| | ACTIVATION CONDITION | TASK CONTENTS | |
|---|---|---|---|
| 7 | ACTIVATION CONDITION | ANALYZE( OBJECT:RECEIVED DATA 「PRINT"abc.doc"FROM PC 82」) | 62 |
| 3 | NO PROCESSING FOR PREDETERMINED PERIOD OF TIME | MAKE ( OBJECT:IDLE PERIOD OF TIME TASK) | |

FIG.6C ↓

ORIGINAL HYSTERESIS

| | ACTIVATION CONDITION | TASK CONTENTS | |
|---|---|---|---|
| 8 | ACTIVATION CONDITION | ANALYZE( OBJECT:"abc.doc" =PULL( ACTOR:A OBJECT:<abc.doc> IOBJECT:PC82)) | 63 |
| 3 | NO PROCESSING FOR PREDETERMINED PERIOD OF TIME | MAKE ( OBJECT:IDLE PERIOD OF TIME TASK) | |

FIG.6D ↓

ORIGINAL HYSTERESIS

| | ACTIVATION CONDITION | TASK CONTENTS | |
|---|---|---|---|
| 9 | ACTIVATION CONDITION | PULL( ACTOR:A OBJECT:<abc.doc> LOBJECT:(PC82)) | 64 |
| 8 | ACTIVATION CONDITION | PRINT( OBJECT:<abc.doc> =PULL) | 65 |
| 3 | NO PROCESSING FOR PREDETERMINED PERIOD OF TIME | MAKE ( OBJECT:IDLE PERIOD OF TIME TASK) | |

FIG.6E ↓

ORIGINAL HYSTERESIS

| | ACTIVATION CONDITION | TASK CONTENTS | |
|---|---|---|---|
| 8 | ACTIVATION CONDITION | PRINT( OBJECT:<abc.doc> =PULL) | 66 |
| 3 | NO PROCESSING FOR PREDETERMINED PERIOD OF TIME | MAKE ( OBJECT:IDLE PERIOD OF TIME TASK) | |

FIG.6F ↓

ORIGINAL HYSTERESIS

| | ACTIVATION CONDITION | TASK CONTENTS | |
|---|---|---|---|
| 3 | NO PROCESSING FOR PREDETERMINED PERIOD OF TIME | MAKE ( OBJECT:IDLE PERIOD OF TIME TASK) | 67 |

FIG.7

| NO | PRECEDING | SUCCEEDING | TIME | ACTION | ACTOR | OBJECT | OTHERS |
|---|---|---|---|---|---|---|---|
| 1 | HEAD | 2 | 2/5 9:00:00 | OPERATE | OPERATOR | [START] | OPERATION UNIT 41 |
| 2 | 1 | 3 | 2/5 9:00:02 | ANALYZE | PRINTER 81 | NO 1 | |
| 3 | 2 | TAIL | 2/5 9:00:03 | START | PRINTER 81 | PRINTER 81 | |
| 4 | HEAD | 5 | 2/5 9:10:00 | DETECT | PRINTER 81 | EXIST PC 82 | PC82 |
| 5 | 4 | 6 | 2/5 9:10:01 | ANALYZE | PRINTER 81 | NO 4 | |
| 6 | 5 | TAIL | 2/5 9:10:02 | REMAKE | PRINTER 81 | KNOWLEDGE | |
| 7 | HEAD | 8 | 2/5 9:30:00 | OPERATE | OPERATOR | [PRINT"abc.doc" FROM PC 82] | OPERATION UNIT 41 |
| 8 | 7 | 9 | 2/5 9:30:02 | ANALYZE | PRINTER 81 | NO 7 | |
| 9 | 8 | 10 | 2/5 9:30:03 | PRINT | PRINTER 81 | PULL OBJ"abc.doc" FROM PC 82 | |
| 10 | 9 | 11 | 2/5 9:30:04 | PULL | PRINTER 81 | "abc.doc" | PC82 |
| 11 | 10 | TAIL | 2/5 9:30:11 | PRINT | PRINTER 81 | "abc.doc" | |

| INPUT ITEMS | | DEFINITIONS |
|---|---|---|
| ORIGINAL HYSTERESIS NO. | | USER'S OPERATION AND INSTRUCTION FROM ANOTHER APPARATUS AND STATUS CHANGE AS CUE FOR EXECUTION OF PROCESS; HYSTERESIS NO. FOR PROCESSING PERFORMED BY SUBJECT APPARATUS |
| ACTION | | USER'S OPERATION AND INSTRUCTION FROM ANOTHER APPARATUS, AND STATUS CHANGE; HYSTERESIS NO. FOR PROCESSING PERFORMED BY SUBJECT APPARATUS |
| | ACTOR | PERFORMER |
| | OBJECT | OBJECT FOR ACTION |
| | IOBJ | DESTINATION OF OBJECT |
| | REASON | REASON OF ACTION |
| | FROM | SOURCE OF OBJECT |
| | INSTR | TOOLS AND MEANS OF ACTION |
| | SUPPORT | LOCATION AND APPARATUS FOR ACTION |
| | TIME | DATA CONCERNING TIMING FOR ACTION, SUCH AS STARTING AND ENDING, AND TIME PERIOD |

| OUTPUT ITEM | DEFINITIONS |
|---|---|
| HYSTERESIS NO | ADDED HYSTERESIS DATA NUMBER |

| INPUT ITEMS | | DEFINITIONS |
|---|---|---|
| HYSTERESIS NO. | | EMPLOYED TO SEARCH FOR ALL HYSTERESIS DATA ASSOCIATED WITH HYSTERESIS NO |
| ACTION | | USER'S OPERATION AND INSTRUCTION FROM ANOTHER APPARATUS, AND STATUS CHANGE; PROCESSING PERFORMED BY SUBJECT APPARATUS |
| | ACTOR | PERFORMER |
| | OBJECT | OBJECT FOR ACTION |
| | IOBJ | DESTINATION OF OBJECT |
| | REASON | REASON OF ACTION |
| | FROM | SOURCE OF OBJECT |
| | INSTR | TOOLS AND MEANS OF ACTION |
| | SUPPORT | LOCATION AND APPARATUS FOR ACTION |
| | TIME | DATA CONCERNING TIMING FOR ACTION, SUCH AS STARTING AND ENDING, AND TIME PERIOD |

FIG.17B

| OUTPUT ITEM | | DEFINITIONS |
|---|---|---|
| SEARCH RESULT DATA | | RESULTS OBTAINED BY SEARCH |
| | HYSTERESIS NO. | HYSTERESIS NO. FOR HYSTERESIS DATA FOUND; OUTPUT A PLURALITY OF HYSTERESIS NUMBERS WHEN A PLURALITY OF HYSTERESIS DATA SETS ARE FOUND. |

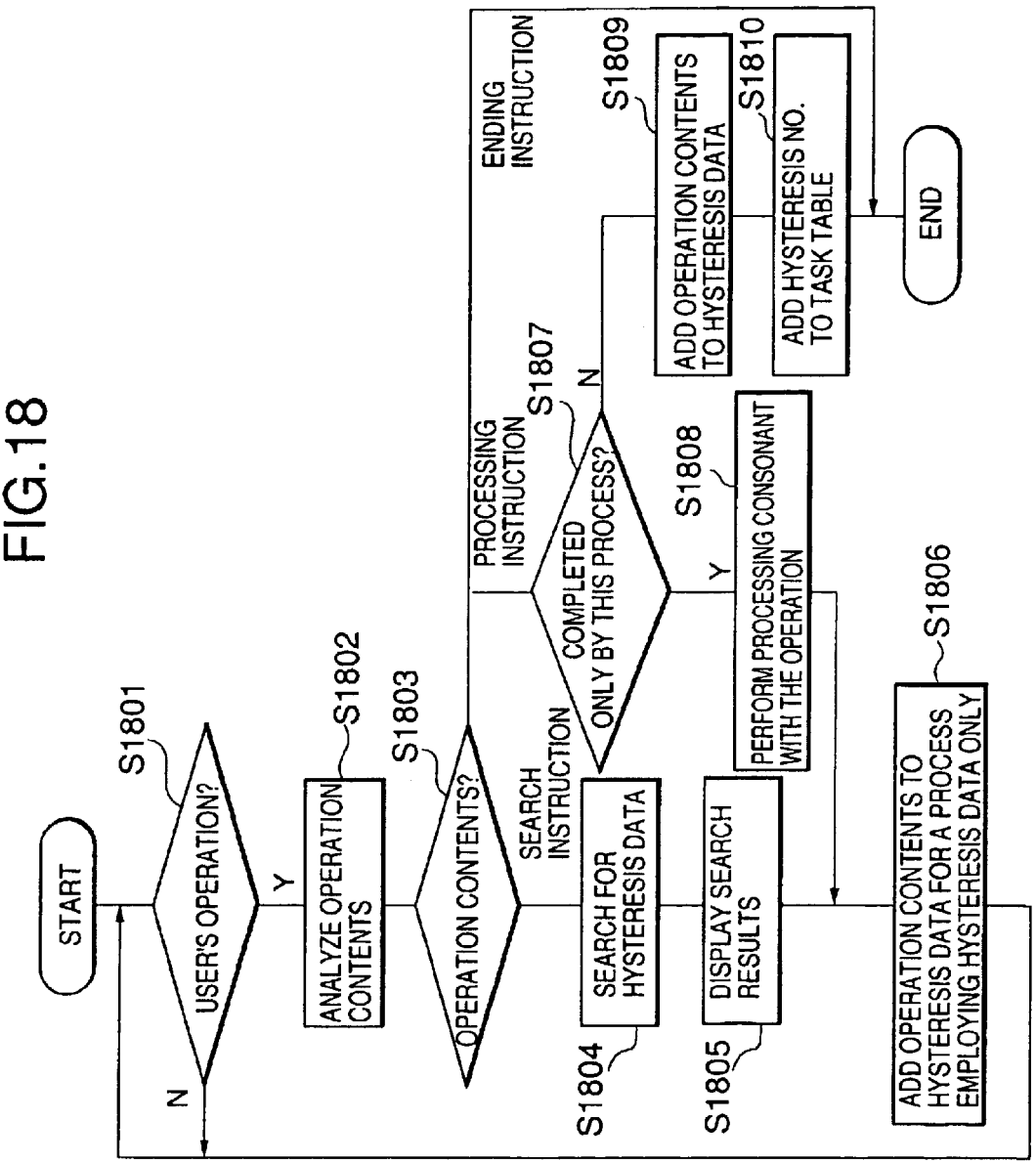

INFORMATION PROCESSING APPARATUS FOR STORING PROCESSING HYSTERESIS DATA, AND METHOD THEREFOR

BACKGROUND OF THE INVENTION

1. Field of the Invention

The present invention relates to an information processing apparatus for storing hysteresis data for operations and processing and for performing processing based on the hysteresis data, and a method therefor.

2. Related Background Art

As is shown in FIG. 1A, with an editing application, such as a word processor, the hysteresis data for operations (deletion, input and input in FIG. 1A) performed by a user in the past can be stored, so that the operation can be re-performed.

Further, as is shown in FIG. 1B, in a Web-browser application, address information for a home page that a user referred to in the past is stored as the hysteresis data for home pages (New product data, ABC Company home page and XYZ Development Division home page in FIG. 1B), so that a home page that was referred to in the past can be referred to again.

An information processing apparatus called a personal computer (hereinafter referred to as a PC) handles electronic information. Therefore, physical information that exists in real space, such as a note that a person wrote or a printed document, is converted into electronic information by an input device, such as a scanner or a digital camera, in order for a PC to handle it. To enable a person to handle electronic information held in a PC, the electronic information must be converted into physical information by an output device, such as a printer or a display device. Assume here that the electronic information held in the PC is output to a printer.

As is shown in FIG. 2, since data are printed via a server 22 by a printer 21, hysteresis (history) data 24 can be stored in the server 22. The stored hysteresis data 24 can be referred to by a person in charge of system management. Since the printer 21 is controlled by the server 22, the server 22 must normally be operating.

When data are printed via a server 25 by the printer 21, hysteresis data 27 are stored only in the server 25. Operations taking place along a route that the server 22 can not manage, can not be stored in the server 22, so that hysteresis data 24 are managed by individual servers.

Since the servers that can store hysteresis data are provided, the hysteresis data are stored in the individual servers, but data, which is transmitted from a PC 23 to the printer 21 directly without passing through the server 22, can not be retained as hysteresis data.

Conventionally, only the minimum data required to refer to an operation in the past are stored as hysteresis data. Therefore, insufficient hysteresis data are available to initiate a new operation, and such an operation, supported only by hysteresis data, can not be performed.

That is, the stored hysteresis data can not be effectively employed for anything other than historical purposes, to confirm the performance of an operation in the past, and for the re-performance of an operation, and for an information processing apparatus other than the one that performed original operation, the hysteresis data is not utilized. Further, the contents of the information to be used for an operation are not stored as hysteresis data.

Based on the idea that input/output devices are PC peripheral devices, the hysteresis data can not be handled by them, and the data are only stored in the PCs when the PCs physically control the input/output devices when performing processing. However, relative to the input/output of physical data, the input/output devices serve as contact points between a user and a PC, and when only the processes performed by the input/output devices under the control of the PC can be stored and used as hysteresis data, this is not only inconvenient for a user, but also it tends to discourage a potential user of the above described system.

When an input/output device only is employed by or when it is used directly by individual PCs, the hysteresis data for the input/output device can not be stored. In order to record the hysteresis data, the input/output device must be connected to the server, and thus a great load is imposed on the server manager.

In addition, since the management of all the input/output devices in a network domain under the control of a sever must be uniform, in order for a server to obtain all the hysteresis data, the load imposed on the server is increased, and is unbalanced.

Further, while a server can not maintain the hysteresis data for an operation performed across a route that it can not manage, it is also impossible for the flow of data to various input/output devices to be controlled by only one server, and in this case, only incomplete hysteresis data can be handled.

SUMMARY OF THE INVENTION

It is, therefore, one objective of the present invention to provide an information processing apparatus that effectively uses hysteresis data for processes that are performed to enhance usability for a user, and a method therefor.

It is another objective of the present invention to provide an information processing apparatus that effectively uses hysteresis data for operations that are entered and are performed to enhance usability for a user.

According to one aspect, the present invention which achieves these objectives relates to an information processing apparatus, comprising:

input means for entering information;

processing means for processing the information entered at the input means; and storage means for storing the information as hysteresis data for an operation that is performed at the input means or by the processing means.

According to another aspect, the present invention which achieves these objectives relates to an information processing method, comprising:

an input step of entering information;

a processing step of processing the information entered at the input step; and a storage step of storing the information as hysteresis data for an operation that is performed at the input step or at the processing step.

According to still another aspect, the present invention which achieves these objectives relates to a computer-readable storage medium on which is stored an information processing program for permitting a computer to perform information processing, the program comprising codes for causing the computer to perform:

an input step of entering information;

a processing step of processing the information entered at the input step; and a storage step of storing the information as hysteresis data for an operation that is performed at the input step or at the processing step.

Other objectives and advantages in addition to those discussed above will become apparent to those skilled in the art during the course of the description of a preferred embodiment of the invention which follows. In the description, reference is made to accompanying drawings, which form a part thereof, and which illustrate an example of the invention. Such example, however, is not exhaustive of the various embodiments of the invention, and therefore, reference is made to the claims that follow the description for determining the scope of the invention.

BRIEF DESCRIPTION OF THE DRAWINGS

FIGS. 6A, 6B, 6C, 6D, 6E and 6F are diagrams showing an example task table;

FIG. 7 is a diagram showing example hysteresis data;

FIGS. 15A and 15B are diagrams showing input/output data for the hysteresis data storage processing;

FIGS. 17A and 17B are diagrams showing input/output data for the hysteresis data search processing;

FIG. 18 is a flowchart showing the processing for employing hysteresis data;

DETAILED DESCRIPTION OF THE PREFERRED EMBODIMENT

The preferred embodiment of the present invention will now be described in detail while referring to the accompanying drawings.

Figure 1A:
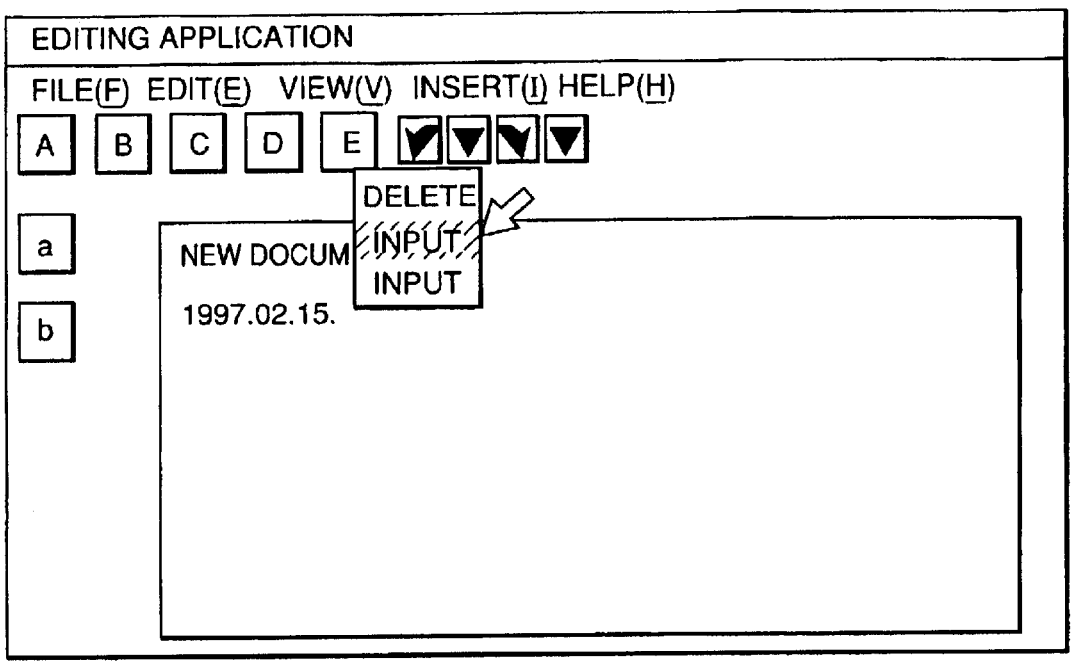
FIGS. 1A and 1B are diagrams for explaining the prior art.
Figure 1B:
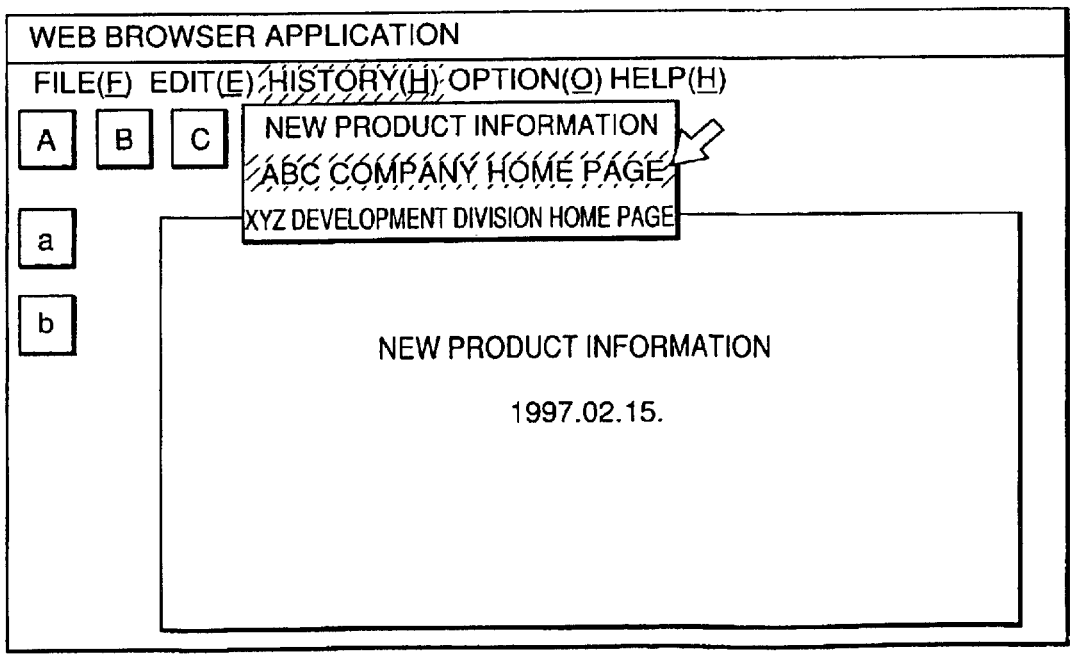
Figure 2:
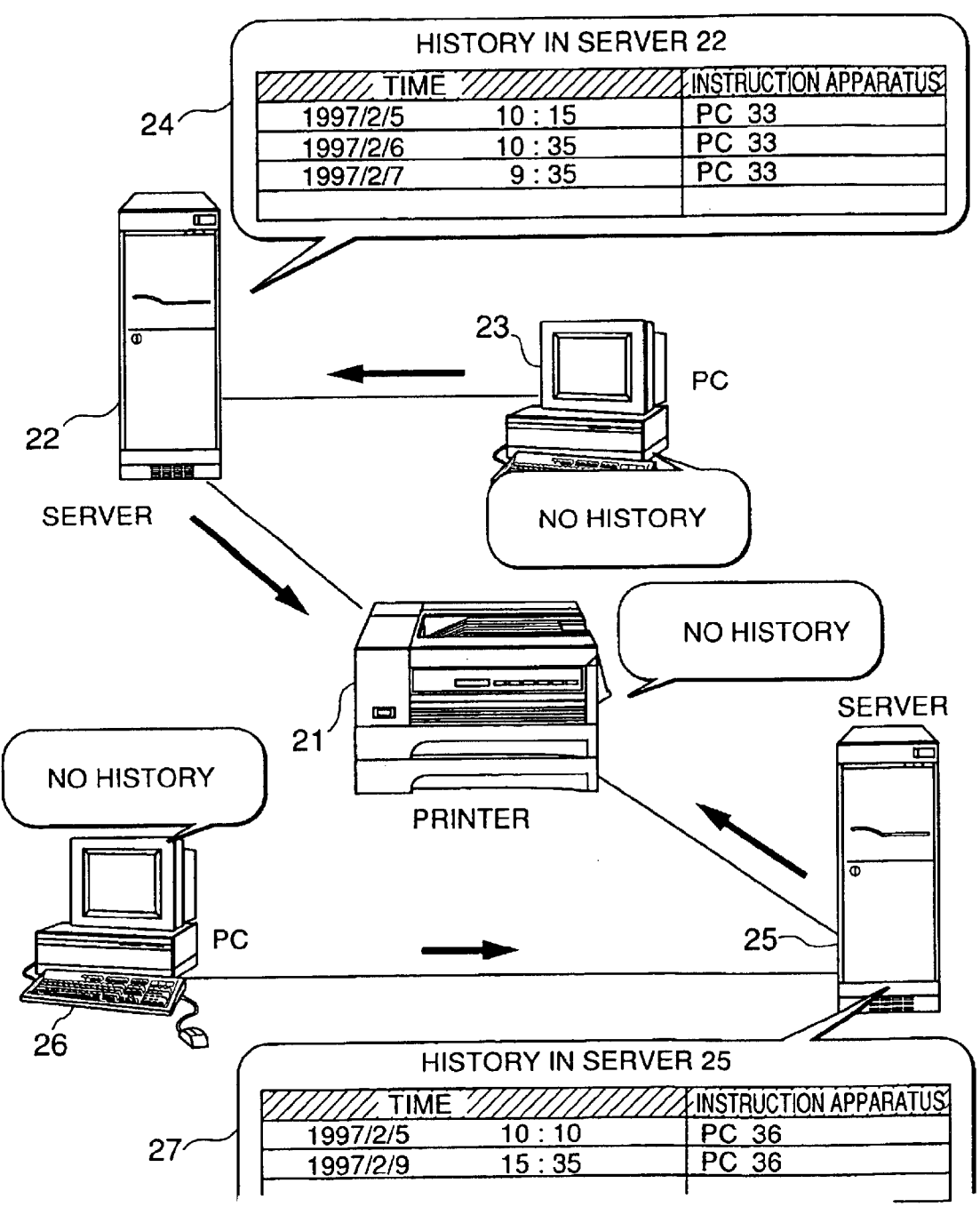
FIG. 2 is a diagram for explaining the prior art.
Figure 3:
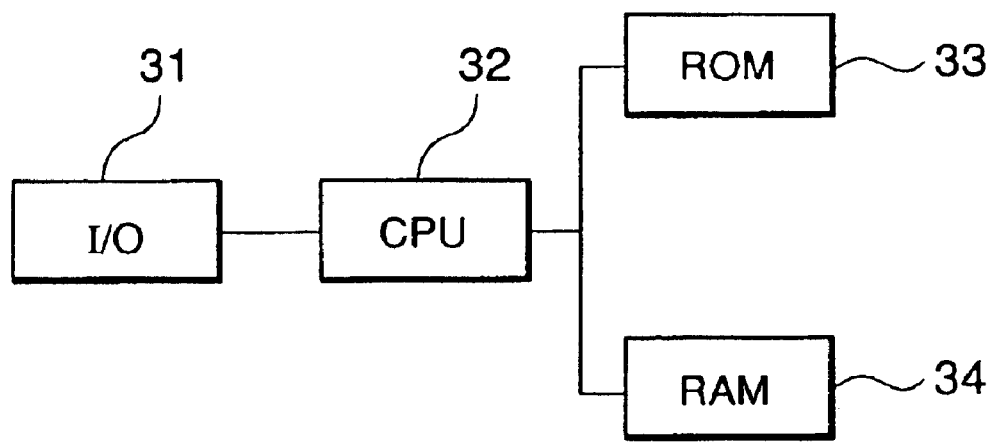
FIG. 3 is a diagram illustrating the hardware arrangement for individual units according to one embodiment of the present invention.

FIG. 3 is a diagram illustrating the hardware arrangement for the individual units that implement the processing according to this embodiment.

An I/O 31 performs input/output with an external device. A CPU 32 executes a program and controls the individual sections. A ROM 33 is used to store constant data, and programs that are to be executed by the CPU 32 and correspond to the flowcharts, which will be described later. A RAM 34 is used to temporarily store a task table 44, which will be described while referring to FIG. 4, variables and intermediate data, such as operation data 42 and hysteresis data 49, that are generated during the processing. The program may be loaded into the RAM 34 from the outside.

Figure 4:
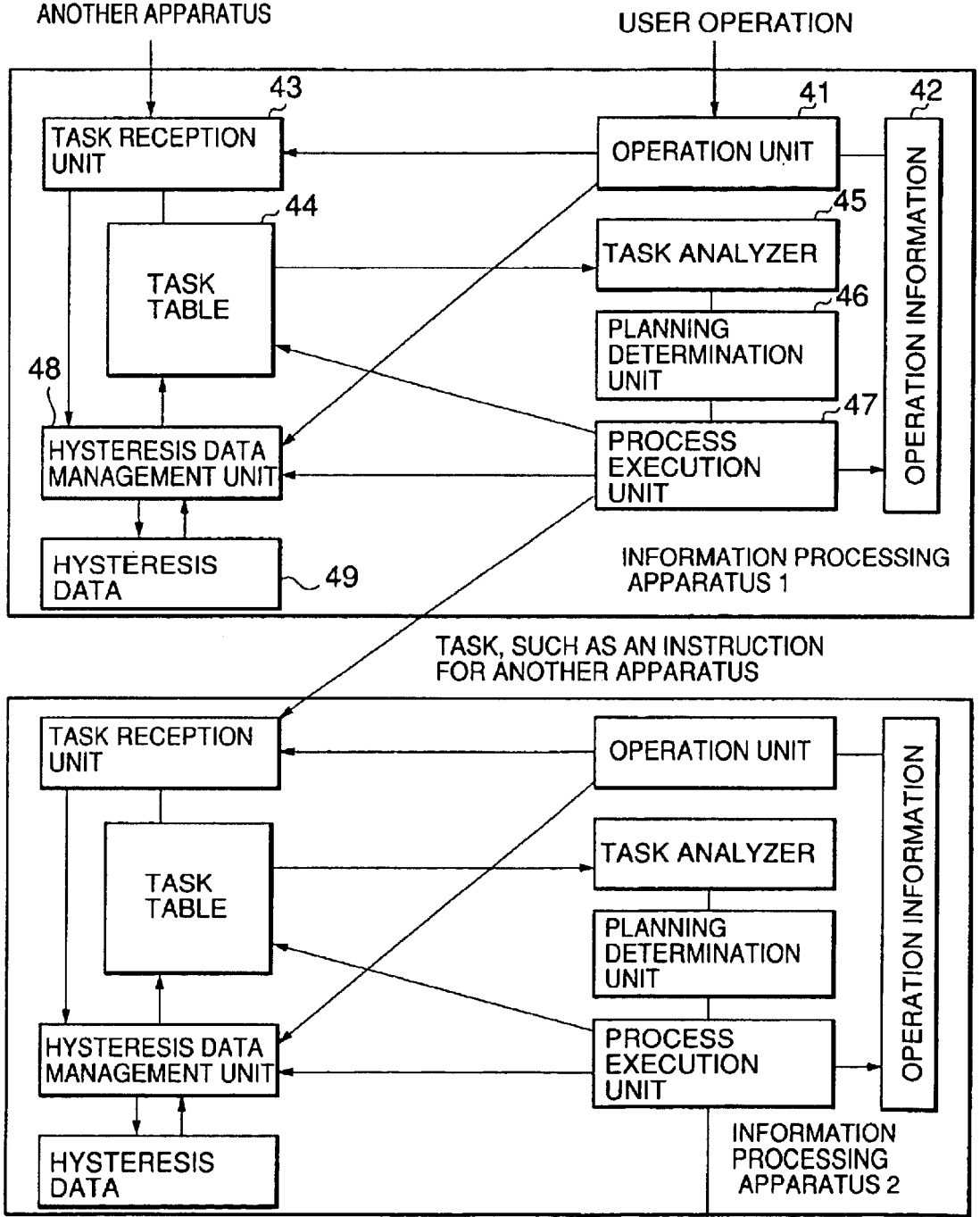
FIG. 4 is a diagram showing the functional arrangement according to the embodiment.
Figure 8:
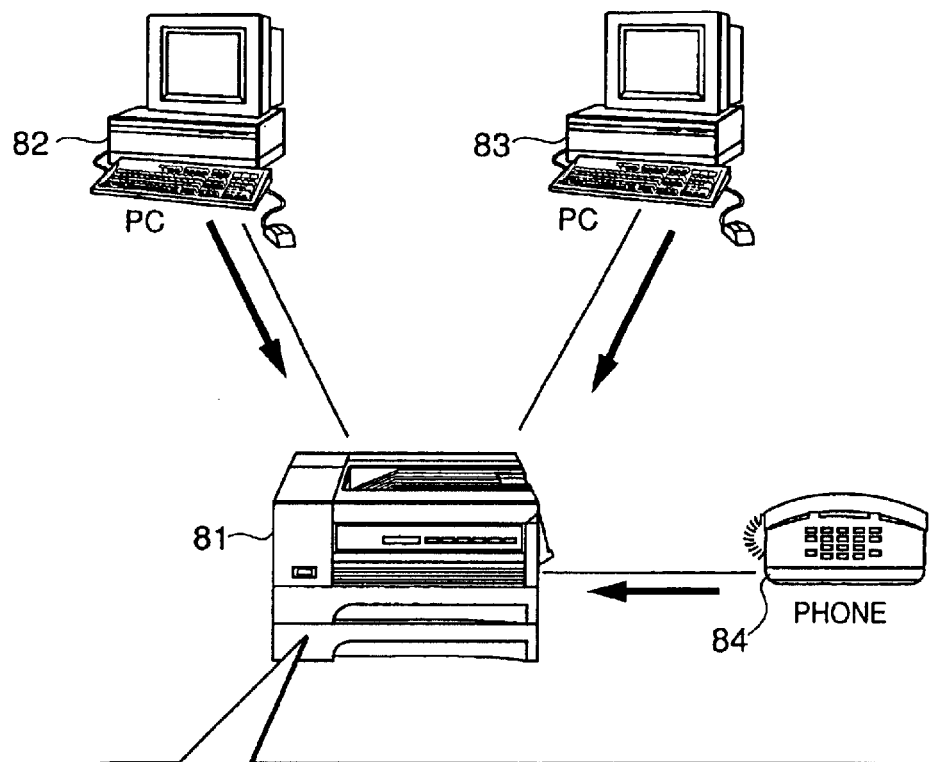
FIG. 8 is a diagram illustrating an example system arrangement according to the embodiment.

FIG. 4 is a diagram showing the functional arrangement according to the embodiment, and FIG. 8 is a diagram illustrating an example system arrangement.

An information processing apparatus 1 in FIG. 4 is, for example, a printer 81 in FIG. 8, and an information processing apparatus 2 in FIG. 4 is, for example, a PC 82 or 83, or a telephone 84 that performs processing in association with the printer 81 in FIG. 8.

In FIG. 8, an action initiated by the PC 82 or 83 or the telephone 84, which is an example for the information processing apparatus 2, the operation of a console unit 41, which will be described later, and the detection of the existence of the PC 82 are stored as hysteresis data 85 in the printer 81, which is one example of the information processing apparatus 1. The hysteresis data will be described later while referring to FIG. 7.

The information processing apparatuses 1 and 2 can be any types of apparatuses so long as they possess the required functions for storing hysteresis data, and may be a printer, a scanner, a facsimile machine, a desktop PC, a filing server, or a digital camera.

In FIG. 4, the console unit 41 displays a screen required for a user in consonance with operation data 42. Information concerning data manipulation (operation), or an instruction entered by the user is transmitted to a task reception unit 43 and a hysteresis data management unit 48.

In FIG. 8, assume that a user instructs the printer 81, which is one example for the information processing apparatus 1, to print file "abc.doc" stored in the PC 82, which is one example for the information processing apparatus 2. Information 707 in FIG. 7 is added to hysteresis data 49 by the hysteresis data management unit 48, and the hysteresis data 49 is transmitted to the task reception unit 34. In this embodiment, it is important that the individual input/output devices include the hysteresis data management unit 48 and the hysteresis data 49, and proper management be provided for these data.

The operation data 42 is information or knowledge that is referred to by the console unit 41, and regulates the operation at the console unit 41. In this embodiment, based on data received by the task reception unit 43, the operation data 42 are changed or updated by a process execution unit 47, which will be described later, in order to implement flexible operating procedures.

According to one of methods employed by the information processing apparatus 1 to control the information processing apparatus 2, the operation data 42 are acquired for the information processing apparatus 2, which changes or updates the operation data 42 of the information processing apparatus 1.

In another example, the presence of the information processing apparatus 2, which is connected across a network to the information processing apparatus 1, is detected, and therefore, it is confirmed that a new function can be obtained by combining the functions of the two information processing apparatuses. And necessary information for instructing the operation of the new function is added to the operation data 42, so that the function, which is a combination of the functions of a plurality of apparatuses, can be performed.

The task reception unit 43 receives not only data from the console unit 41, but also, as a status change, receives changes effected in the environment of the information processing apparatus 1, and tasks from other apparatuses, such as the information processing apparatus 2. When the information processing apparatus is connected to a network, the reception task 43 also detects the connection of a new apparatus to the network, receives print instructions from other apparatuses as tasks, and detects a state wherein no process has been performed for a constant period of time.

The task reception unit 43 adds received data as a new task to the task table 44, and also transmits it to the hysteresis data management unit 48. The task reception unit 43, as well as the process execution unit 47, which will be described later, is required for communication with a different apparatus.

When, in FIG. 8, the PC 82, which is the information processing apparatus 2 connected via the network to the printer 81, which is the information processing apparatus 1, is powered on, the presence of the PC 82 is detected, and information 705 in FIG. 7 is added to the hysteresis data 49 by the hysteresis data management unit 48.

FIGS. 6A to 6F are diagrams showing an example task table 44.

As is shown in FIGS. 6A to 6F, in the task table 44 are entered the activation conditions and the contents of tasks, and a task having a hysteresis number is entered in the hysteresis data 49 for a process that is the source of the performance of individual tasks. In FIGS. 6A to 6F, the tasks are arranged, beginning at the top of the table, in the order of priority. The addition of the task to the task table 44 is performed by the previously-described task reception unit 43 and the process execution unit 47, which will be described later. The hysteresis number in the hysteresis data 49 of the process, which is the source for the performance of the tasks, is provided by the hysteresis data management unit 48. The extraction of the task from the task table 44 is performed by a task analyzer 45, which will be described later.

ANALYZE in a task column 62 in the task table 44 in FIG. 6B is a task that is generated in response to the manipulation by a user [Print "abc.doc" from PC 82] at hysteresis No. 7, which is indicated by the hysteresis data 707 in a table for the hysteresis data 49 in FIG. 7. Thus, a value of "7" is stored in the Original hysteresis column, the activation condition is defined as no condition, and the contents of the task are defined as an analysis of the manipulation by the user. Since the task 62 is added as hysteresis No.8 to the hysteresis data 49, a value of "8" is set in the Original hysteresis for a task 63, which is generated based on the task 62, and similarly, a value of "9" is set in the Original hysteresis for a task 64.

The task analyzer 45 extracts the highest priority task from the task table 44, and analyzes the purpose of the task. With this analysis, at a planning determination unit 46 and the process execution unit 47, which will be described later, the performance of less efficient operations is prevented, and an optimal process can be performed.

For example, the task 63 stored in the task table 44 in FIGS. 6A to 6F is analyzed as having a direct purpose of printing, and a final purpose is delivery of a printed document to a user. If the final purpose can be achieved by a more efficient method, it is understood that even the performance of printing may be unnecessary, and planning for the processing is performed in accordance with the analysis.

The planning determination unit 46 receives the analysis from the task analyzer 45, and refers to the planning knowledge for the planning of a process to be performed to achieve the task. For the task 63 stored in the task table 44 in FIG. 6C, the operation Object: "abc.doc"=PULL from the PC 82 is planned before the object is printed.

The process execution unit 47 performs the processing in consonance with the contents determined by the planning determination unit 46, and transmits the processing contents to the hysteresis data management unit 48. When the printing is executed, for example, information 711 in FIG. 7 is added to the hysteresis data 49 by the hysteresis data management unit 48.

Upon the receipt of the instructions from the console unit 41, the task reception unit 43, or the process execution unit 47, in consonance with an operation performed by an operator, such as searching, editing, deleting, or condition/setup changing, the entry/reception of an instruction or information from another information processing apparatus, the detection of a status, and the performance of a process performed by the subject apparatus, such as reading, printing, displaying, transmitting, saving or holding of information, the hysteresis data management unit 48 adds to the hysteresis data 49, (correlated with the individual hysteresis data) information concerning an actor, such as an operator, an instructor or a person in charge of processing; information concerning an action that is executed, such as manipulation, an instruction or a process; information concerning time of manipulation, an instruction, or a process; information concerning a location or an apparatus whereat manipulation, an instruction or a process takes place; and information concerning an object that is manipulated, instructed or processed. Further, the hysteresis data management unit 48 outputs hysteresis numbers relative to the added hysteresis data.

The data, added to the hysteresis data 49, for the object that is manipulated, instructed or processed are stored in correlation with data that are handled by another application, such as file data, schedule data, pending data for processing, a database (address list, etc.), data extracted from specific data or mail device management data, so that the employment of such data by individual applications is easy.

The hysteresis condition designation operation, which is performed according to the instructions from the console unit 41, the task reception unit 34 and the process execution unit 47, can be used to determine whether hysteresis data corresponding to the operation, the instructions or the processing should be saved, and whether the substance of the object should be saved, and to designate a person who can refer to the hysteresis data. The data are added to the hysteresis data 49 according to the designations.

In the hysteresis data usage process that is performed in accordance with the instructions from the console unit 41, the task reception unit 43 or the process execution unit 47, based on the hysteresis data 49 for the individual apparatuses that have been entered, the process is re-performed; a new process, such as printing, displaying, transmitting, saving, searching, action pending, editing or deleting, is performed for the past process; the setup for an alteration/saving condition for the period for saving hysteresis data is changed, or knowledge concerning the operation and the processing is updated.

FIG. 7 is a diagram showing example hysteresis data 49.

As is shown in FIG. 7, the hysteresis data 49 is composed of: a Hysteresis No.; a Pre-hysteresis number, which is a hysteresis No. for hysteresis data for the process on which is based the generation of the processes represented by the individual hysteresis; a Post-hysteresis number, which is the hysteresis No. for the hysteresis data for the process that is generated in response to the processes represented by the individual hysteresis; an Execution time for the process represented by the hysteresis; a Type of action; a Person for whom action is performed; an Object to be processed; and Other information, such as an action source, an action destination, and a location for the action.

For example, [No=7], in 707 in FIG. 7, designates 7 as the hysteresis number for the hysteresis data. Further, [preceding=head] indicates that the process represented by this hysteresis is a cue for a processing sequence, and constitutes the first process. [Succeeding=8×] designates 8 as the hysteresis number for the process that is generated based on the process represented by the hysteresis.

[Time=2/5 9:30:00] indicates that the process represented by the hysteresis was performed February 5, at 9:30:00. [Action=Operate] indicates that the process for this hysteresis is an operation. [Actor=Operator] indicates that an operator performed the process at this hysteresis. [Object= "Print 'abc.doc' from PC 82"] indicates that the object of the process for the hysteresis is an instruction "Print 'abc.doc' from PC 82." [Others=Console unit 41] indicates that the process for this hysteresis was performed by the console unit 41.

Figure 5:
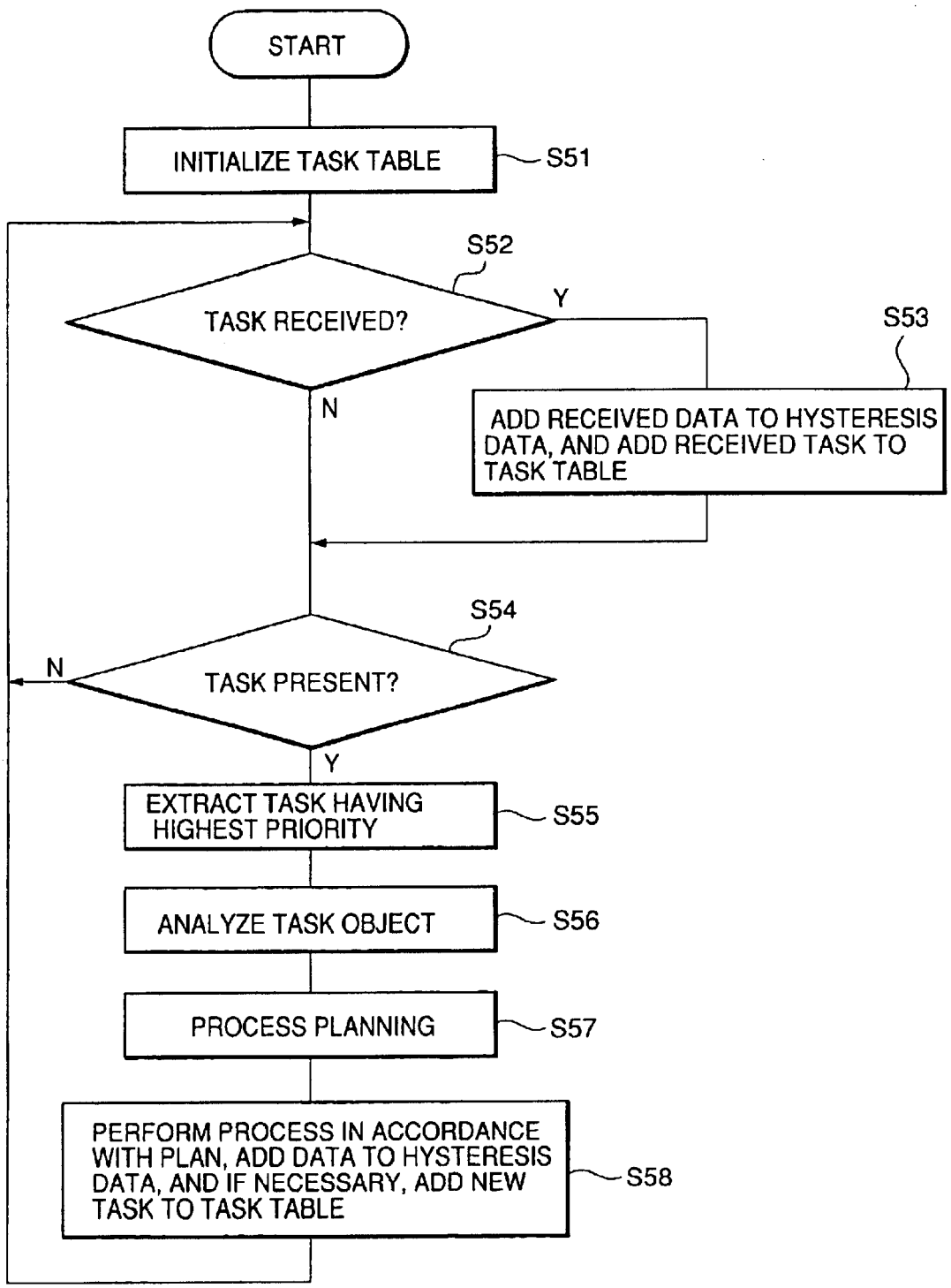
FIG. 5 is a flowchart showing all the processing for the embodiment.

FIG. 5 is a flowchart showing the general processing according to this embodiment.

When the information processing apparatus 1 is activated, at step S51 the task table 44 is initiated, as is shown in FIG. 6A.

At step S52, a check is performed to determine whether the task reception unit 43 has received, as a status change, information concerning an instruction entered by a user at the console unit 41, an environmental change or a task from another apparatus. When a task is received, program control moves to step S53, whereat the reception of data is additionally recorded to the hysteresis data 49, as is shown by 704 in FIG. 7, and the reception data analysis task 62 is added at the beginning of the task table 44, as is shown in FIG. 6B.

At step S54, a check is performed to determine whether there is an executable task in the task table 44. If there is no such task, program control returns to step S52, whereat the reception of a task is examined. When, at step S54, an executable task is present, program control advances to step S55, whereat the task having a highest priority is extracted from the task table 44.

At step S56, the purpose of the task is analyzed, and at step S57, the process to be performed is determined and process planning is performed. If the task table 44 is as is shown in FIG. 6B, ANALYZE, which is the task 62 having the highest priority, is extracted, it is confirmed that the purpose of the task is analyzation of the received data, and planning for the processing for the initiation of analyzation is performed.

At step S58, the processing is performed according to the plan, and a relevant record is added to the hysteresis data 49, as is shown by 710 in FIG. 7. A new task may be added to the task table 44, if necessary.

When the received data are analyzed as planned for the ANALYZE task 62 in FIG. 6B, the instruction "Print 'abc.doc' from PC" entered by the user at the console unit 41 is analyzed, and PRINT, which is a new task 63, is added, as is shown in FIG. 6C.

Program control returns to step S52. However, since a new task has not yet been received, program control moves to step S54 and the above process is repeated. As a result, PRINT for the task 63 in FIG. 6C, which was previously added at step S58, is extracted, analyzed and planned. In this case, to execute the PRINT task, it is confirmed that the Object is present in the information processing apparatus 1, and a new task 64, PULL, and a task 65, PRINT, that uses the pulled object are added as is shown in FIG. 6D.

When the processing is further repeated, the task 64, PULL, in FIG. 6D is executed. When the processing is further repeated, the Object obtained as the result of the task PULL is used to execute the task 64 in FIG. 6E.

As a result, the task table 44 is returned to the same state as when it was initialized, as is shown in FIG. 6F.

The processing performed by the console unit 41 will now be described.

Figure 9:
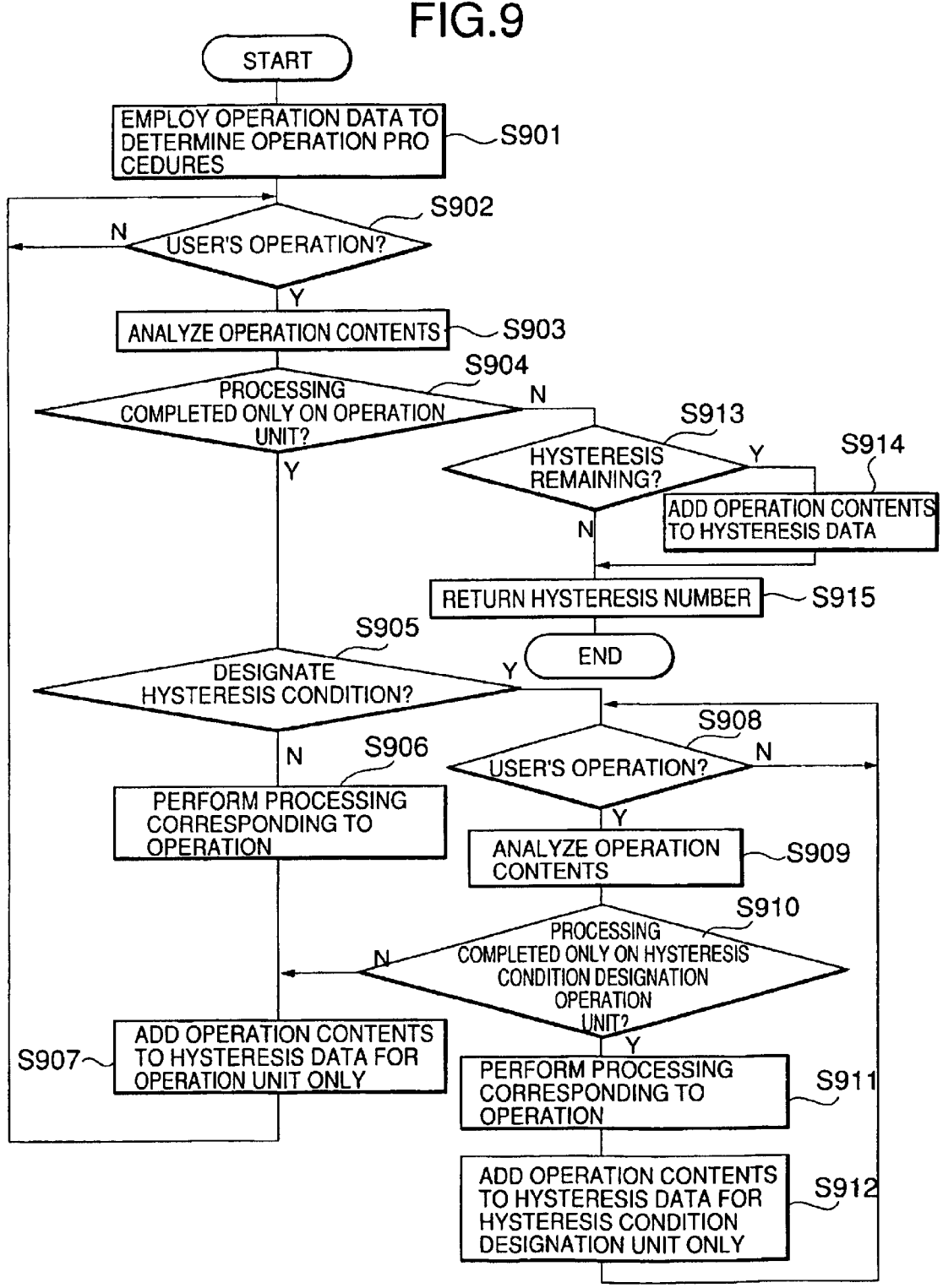
FIG. 9 is a flowchart showing the processing performed by a console unit.
Figure 10:
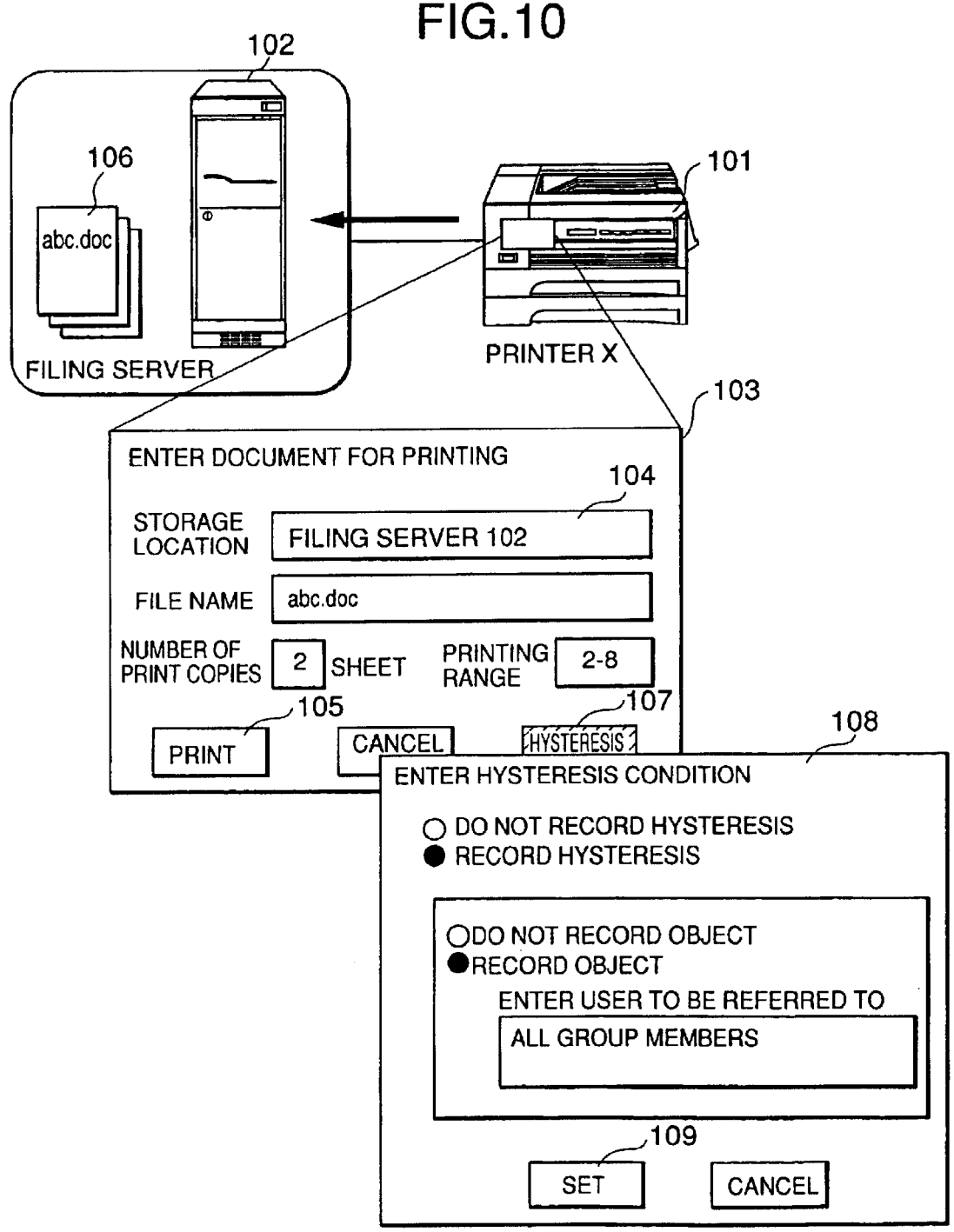
FIG. 10 is a diagram showing an example operation display screen.
Figure 11:
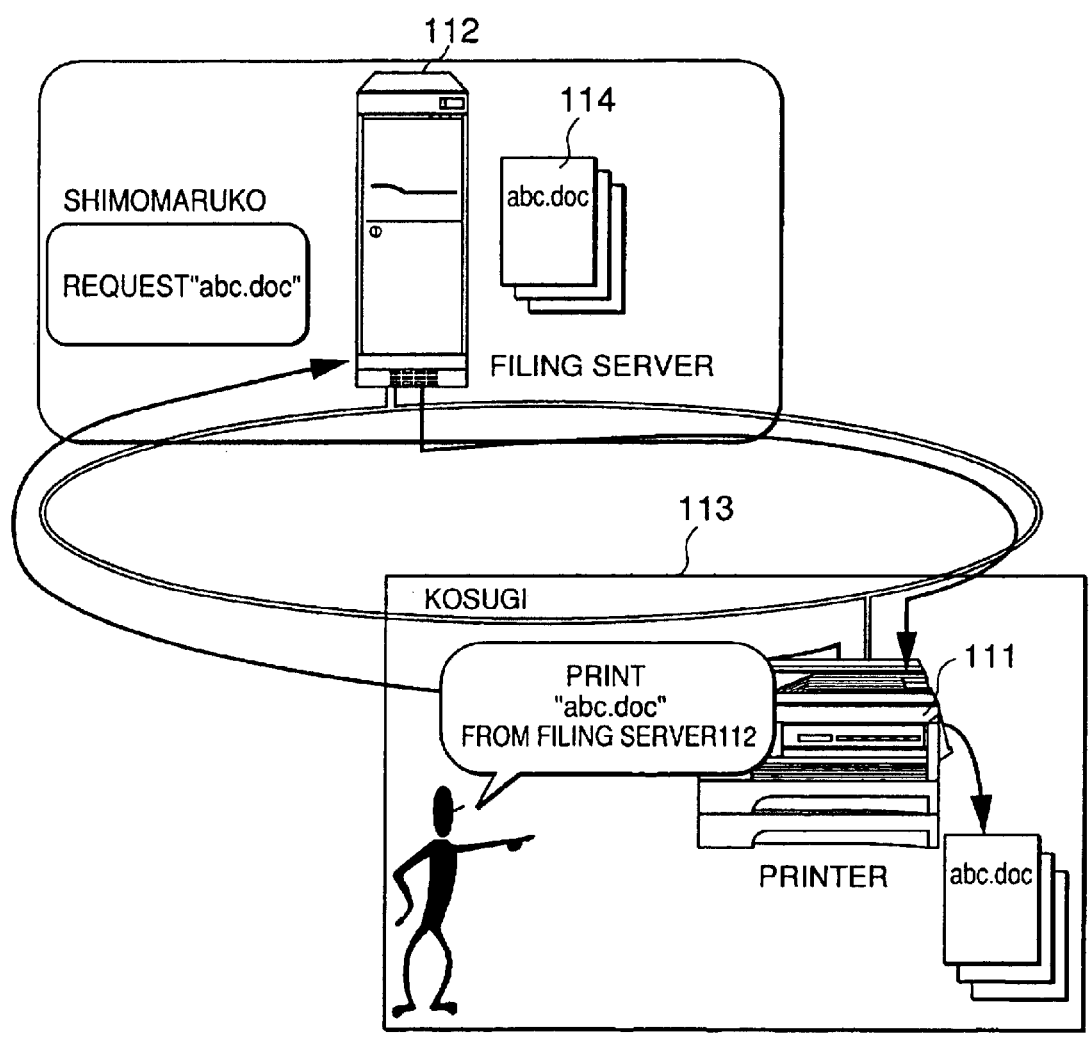
FIG. 11 is a diagram for explaining an example operation of a system when an operation is instructed by voice.

FIG. 9 is a flowchart showing the processing performed by the console unit 41. FIG. 10 is a diagram illustrating an example screen displayed by the console unit 41. FIG. 11 is a diagram for explaining the operation of a system when a voice instruction is entered at the console unit 41.

In consonance with manipulation by a user, the console unit 41 of the information processing apparatus 1 separately performs an operation that can be completed only by the process in the console unit 41, and the operation of the process must be performed via the task reception unit 43.

For example, the process for changing a character string or a variable in the console unit 41, which corresponds to the entry/deletion of a character string in an input box 104 of a screen 103 in FIG. 10, is completed by the process performed inside the console unit 41. When actual printing can not be performed by the console unit 41 after a print button 105 has been selected, it is performed externally via the task reception unit 43.

The processing performed by the console unit 41 will now be described while referring to the flowchart in FIG. 9.

When the console unit 41 is activated, at step S901, the information defined in the operation data 42 is referred to in order to determine the operation procedures, including the contents of the display screen.

At step S902 a check is performed to determine whether or not a user has actually performed an operation, such as the entry of a character string. If the user has not entered anything, the process at step S902 is repeated until the manipulation is performed.

At step S903, the manipulation by the user is analyzed. When, at step S904, it is ascertained that the process has been completed only by the console unit 41, program control moves to step S905. When the process outside the console unit 41 is reacquired, program control goes to step S913.

At step S905, a check is performed to determine whether the manipulation by the user is a designation for a hysteresis condition shown by 106 in FIG. 10. When an instruction is other than the designation of the hysteresis condition, program control moves to step S906.

At step S906, if a process corresponds to the manipulation by the user, which is an action other than the designation of the hysteresis condition, the displayed character string is changed or the variable in the console unit 41 is updated. At step S907 the manipulation data are added to the hysteresis data in the console unit 41. When the hysteresis data in the console unit 41 are employed, the manipulation performed by the user can be canceled (UNDO) or repeated (REDO). Program control then returns to step S902 to accept an entry by the user.

If, at step S905, the entry by the user concerns the designation of the hysteresis condition, program control goes to step S908, whereat the hysteresis condition designation unit performs the process.

When the hysteresis condition designation unit is activated, at step S908 a check is performed to determine whether a manipulation was actually performed by the user, such as the input of a character string. If no manipulation was performed, the process at step S908 is repeated until a manipulation occurs.

As step S909, the manipulation of the user is analyzed. When, at step S910, it is ascertained that the process was completed only by the hysteresis condition designation unit, program control moves to step S911. When the process outside the hysteresis condition designation unit is reacquired, program control goes to step S907.

At step S911, in response to the manipulation by the user, the displayed character string is changed, or the variable in the hysteresis condition designation unit is updated. At step S912, the manipulation data is added to the hysteresis data in the hysteresis condition designation unit. Since the hysteresis data in the hysteresis condition designation unit is used, the manipulation by the user can be re-performed (UNDO) or repeated (REDO). Program control then returns to step S908 to accept the manipulation by the user.

When, at step S902, the process outside the console unit 41 is required, program control moves to step S913, and whether or not saving of the hysteresis data is designated is determined by the previously described hysteresis condition designation unit, or by the standard setup by the user.

As a result, when the saving of the hysteresis data is designated, program control goes to step S914. The contents of the manipulation are added to the hysteresis data 49, via the hysteresis data management unit 48, and the hysteresis number that is acquired is returned. The processing is thereafter terminated.

Since the contents of the manipulation added to the hysteresis data 49 are employed as a cue for the processing that is to be performed, they are defined as being the first of the hysteresis data sequence when they are added. When the hysteresis data are actually added, the hysteresis number is returned from the hysteresis data management unit 48, and is then returned to the console unit 41. When there is no need to save the hysteresis data, an invalid value is returned as the hysteresis number. The processing is thereafter terminated.

The specific processing performed by the console unit 41 will now be described while referring to the flowchart in FIG. 9 and the example display screen in FIG. 10.

When the console unit 41 is activated, at step S901 the information defined for the operation data 42 is referred to in order to determine the operating procedures, and the screen 103 in FIG. 10 is displayed.

In accordance with instructions on the screen 103, the user enters character string "Filing Server 102" in the input box 104 to designate the storage location of a document to be printed. At step S902 the entry of the character string is detected, and at step S903 the contents entered by the user are analyzed.

At step S904, it is ascertained that the process can be completed only by the console unit 41, and at step S905 it is ascertained that the hysteresis condition designation has not been instructed.

At step S906, in consonance with the character string that was entered, the display on the screen 103 is changed and the variable in the console unit 41 is updated. At step S907, the information that the character string is stored as hysteresis data in the console unit 41 is added. Since the hysteresis data for the console unit 41 is used, an input error can be corrected easily.

When the user selects the hysteresis condition button 107 to instruct the designation of the hysteresis condition, a hysteresis condition designation screen 108 is displayed.

In accordance with an instruction on the screen 108, the user enters a checkmark in the item "saving hysteresis" (white circle is changed to black). Then, at step S908 the occurrence of a specific manipulation is detected, and at step S909 the manipulation performed by the user is analyzed.

As a result, at step S910 it is ascertained that the process can be completed only by the hysteresis condition designation unit. At step S907 in consonance with the manipulation by the user, the display on the screen 108 is changed, and the setup is changed to save the hysteresis. At step S912 the information that the setup has been changed is added to the hysteresis data of the hysteresis condition designation unit. When the hysteresis data is used, a manipulation error can be corrected easily. Similarly, whether the substance, which is the object to be processed, should be saved can be designated on the screen 108, and a specific user or a group member can be designated as a user who can refer to the hysteresis.

When all the required conditions are designated by the above processing the user selects a setup button 109 to instruct the validation of the designations. At step S910 it is ascertained that the process can not be completed only by the hysteresis condition designation unit, and program control moves to step S907, while the setup contents are validated.

In the console unit 41, the file name, the print copy, the print range, and the necessary process to be executed are designated, as well as the storage location of the document to be printed. And when the user selects a print button 105 to instruct the performance of the process based on these designations, it is ascertained that the process can not be completed only by the console unit 41, and program control goes to step S913, whereat it is ascertained that the saving of the hysteresis data is designated.

As a result, program control moves to step S914, and via the hysteresis data management unit 48, the manipulation contents are added to the hysteresis data 49, while they are defined as the first of the hysteresis data sequence, and the acquired hysteresis number is returned to the console unit 41. The processing is thereafter terminated.

When the cancel button is selected, the operation performed is ineffective. To avoid a complicated explanation, no further explanation for this will be given.

The specific processing performed by the console unit 41 when an instruction is entered by voice will now be described while referring to FIG. 11.

FIG. 11 is a diagram showing an example where a file "abc.doc" is obtained from a filing server 112, which is an example information processing apparatus 1, via a printer 111, which is one example of the information processing apparatus 1, and is printed.

First, the user gives the instruction orally "Print 'abc.doc' from Filing Server 112" to the printer 111, which is an example information processing apparatus 1, and at step S902 voice input is detected and at step S903 the instruction by the user is analyzed.

If it is ascertained that the console unit 41 can not understand the voice instruction, at step S904 it is ascertained that the process can not be completed only by the console unit 41. Program control moves to step S913, whereat a check is performed to determine whether the recording of hysteresis data is designated.

When, for example, the recording of hysteresis data is set as the standard, program control goes to step S914. Via the hysteresis data management unit 48, the manipulation contents are added to the hysteresis data 49 while they are defined as the first of the hysteresis data sequence, and the acquired hysteresis number is returned to the console unit 41. The processing is thereafter terminated. The voice instruction process is assigned to the task reception unit 43.

The processing performed by the task reception unit 43 will now be explained.

Figure 12:
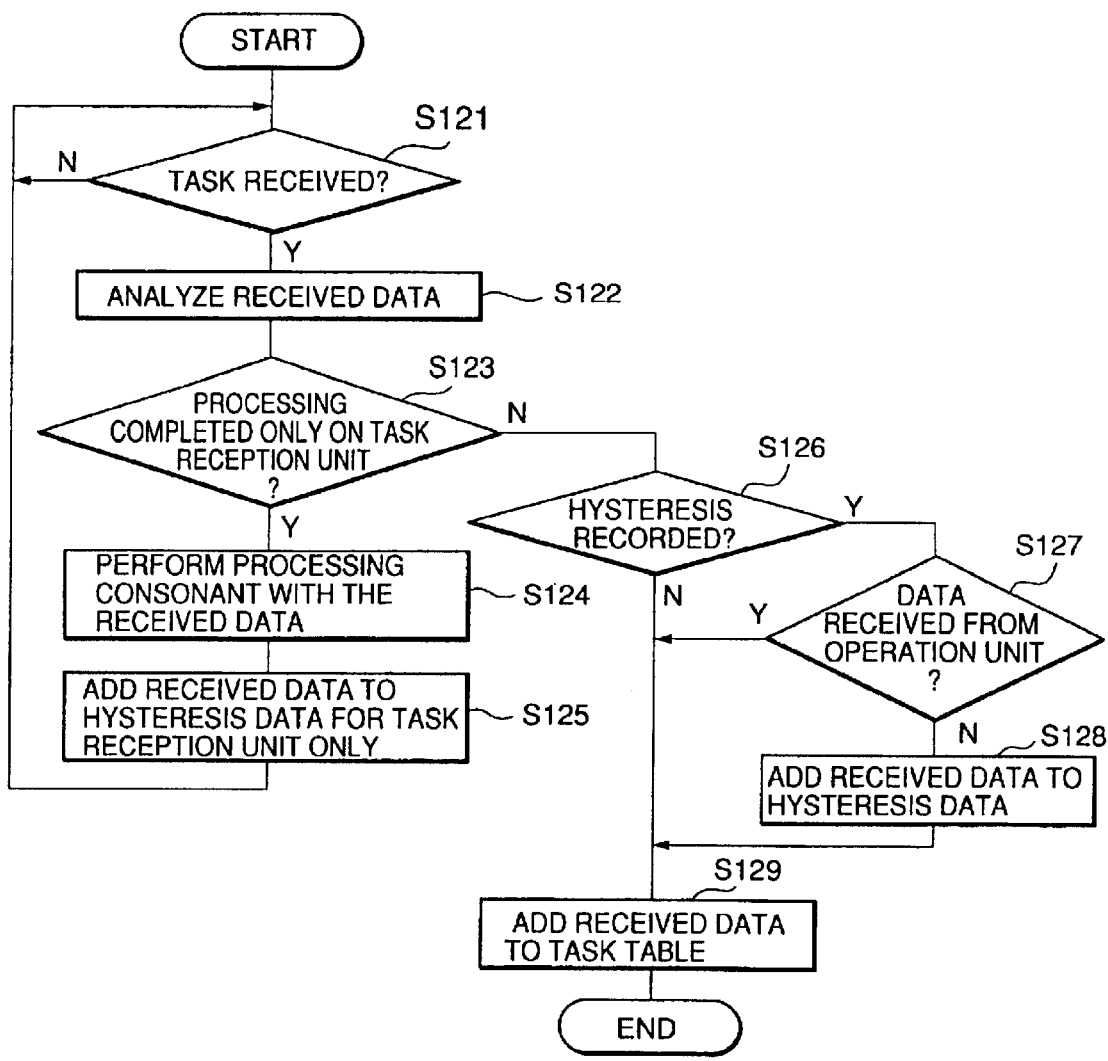
FIG. 12 is a flowchart showing the processing performed by a task reception unit.

FIG. 12 is a flowchart showing the processing performed by the task reception unit 43.

The task reception unit 43 of the information processing apparatus 1 handles, as reception tasks, all the information concerning the information processing apparatus 1, such as the contents of the manipulation by the user obtained by the console unit 41, and their hysteresis number, instructions and data received from the information processing apparatus 2, which is connected to the information processing apparatus 1 via the network, the external status information detected by the information processing apparatus 1, and the information concerning a document that is entered from the input section of the information processing apparatus 1.

The task reception unit 43 separates a received task that can be completed only by the task recaption unit 43, and a received task that must be added to the task table 44 and performed outside the task reception unit 43.

For example, the simple data exchange process according to the protocol, which corresponds to a task accompanied by basic communication, such as TCP/IP or HTTP, between the information processing apparatuses 1 and 2 connected via the network, can be completed only by the task reception unit 43. The process for the manipulation contents entered by the user at the console unit 41 and the hysteresis number, and the designation of the process from the information processing apparatus 2, which is connected to the information processing apparatus 1 via the network, can not be performed by the task reception unit 43. Thus, the task is added to the task table 44 so as to be performed outside the task reception unit 43.

The specific processing performed by the task reception unit 43 will now be explained, while referring to the flowchart in FIG. 12.

When the task reception unit 41 is activated, at step S121 a check is performed to determine whether a task has been received. If a task has not been received, the process at step S121 is repeated until one is received.

At step S122 the received task is analyzed, and at step S123 a check is performed to determine whether the received task can be completed only by the task reception unit 43. If the task can be so completed, program control advances to step S124.

At step S124 the process corresponding to the received task is performed, and a simple data exchange is also performed according to the protocol. At step S125 the received task information is added to the hysteresis data in the task reception unit 43. When the hysteresis data in the task reception unit 43 is used, the process can be canceled (UNDO) or repeated (REDO) in order to avoid a problem in the communication procedures due to noise. Then, program control returns to step S121 to accept a task.

When, at step S123, it is ascertained that a process outside the task reception unit 43 is required, program control moves to step S126. A check is then performed to determine whether the saving of the hysteresis data has been designated by the hysteresis condition designation unit in the console unit 41, by a standard setup by the user, or by the setup of the reception task unit 43.

When the saving of the hysteresis data is designated, program control advances to step S127, and a check is performed to determine whether the received task was received from the console unit 41. If the task is from the console unit 41, since the hysteresis is already added to the hysteresis data 49 by the console unit 41, addition of the hysteresis data is not performed. Program control thereafter moves to step S129.

When, at step S127, the task has been received from a source other than the console unit 41, program control moves to step S128. The contents of the task are added to the hysteresis data 49 via the hysteresis data management unit 48, and the hysteresis number is acquired. Since the contents of the task added to the hysteresis data 49 are used to initiate the processing to be performed later, the task is defined as the first hysteresis data sequence.

At step S129, the hysteresis numbers received from the console unit 41, or the hysteresis number returned from the hysteresis data management unit 48 when the hysteresis data are added at step S128, are set to the original hysteresis number of the task, and are added to the task table 44. When, at step S126, there is no need to save the hysteresis, an invalid value is set as the original hysteresis number for the task, and is added to the task table 44.

The processing performed by the process execution unit 47 will now be described.

In consonance with the contents of the processes to be performed, the process execution unit 7 of the information processing apparatus 1 separates the process that can be completed by the process execution unit 47, and a process that must be preformed outside the process execution unit 47, while adding a new task to the task table 44.

Figure 13:
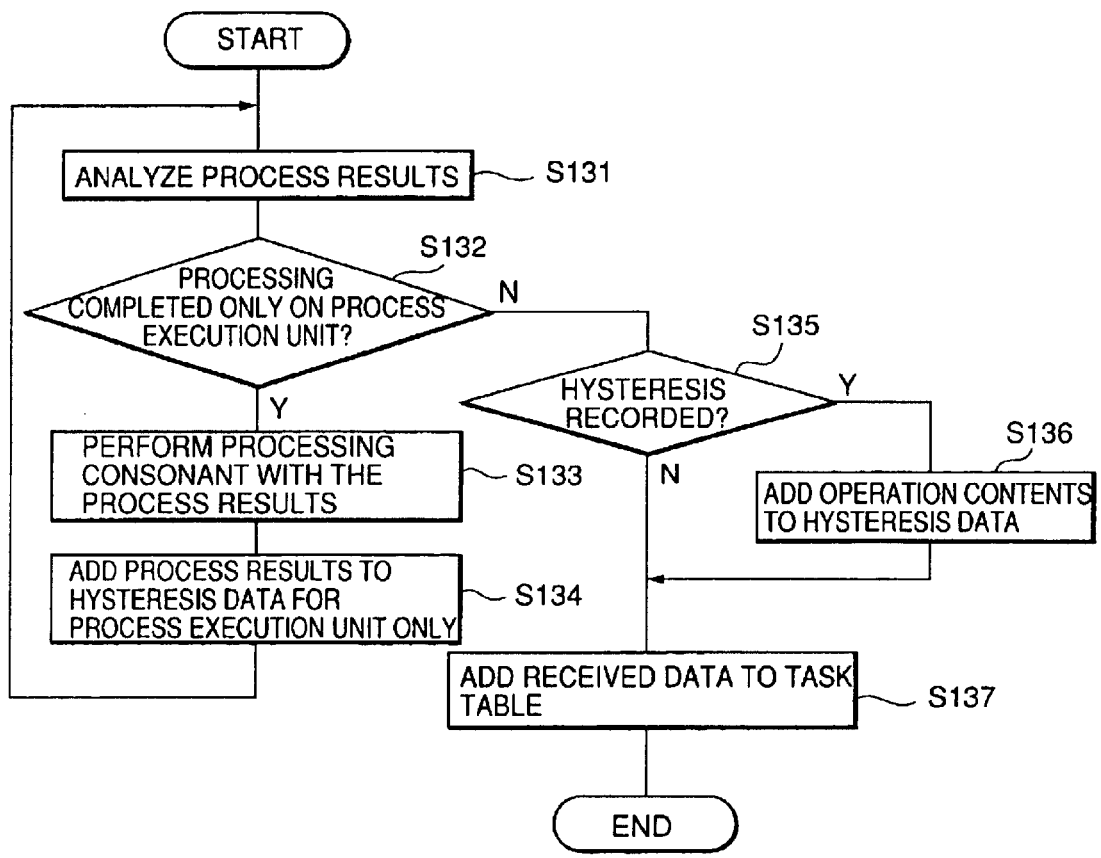
FIG. 13 is a flowchart showing the processing performed by a processing execution unit.

The specific processing performed by the process execution unit 47 will now be described while referring to the flowchart in FIG. 13.

When the process execution unit 47 is activated, at step S131 the contents of the process are analyzed, and at step S132 a check is performed to determine whether the process can be completed only by the process execution unit 47. If the process can be completed, program control advances to step S135.

At step S133 the process according to the analyzed contents is performed, and at step S134 the contents of the process are added to the hysteresis data for the process execution unit 47. When the hysteresis data in the process execution unit 47 are used, the process can be canceled (UNDO) or repeated (REDO). Then, program control returns to step S131 to continue the remaining process.

When the process can not be completed only by the process execution unit 47, at step S135 a check is performed to determine whether the original hysteresis number, which is designated for a task that corresponds to the process, is the valid original hysteresis number that designates the saving of the hysteresis. If the hysteresis number is valid, the hysteresis is saved, and if it is invalid, the hysteresis is not recorded.

When the saving of hysteresis is ascertained, program control moves to step S136, whereat via the hysteresis data management unit 48, the contents of the process are added to the hysteresis data 49 and the hysteresis number is acquired.

At step S137, when the hysteresis data are added at step S136, the hysteresis number referred from the hysteresis data management unit 48 is set as the original hysteresis number for the task, and is added to the task table 44. When at step S135 the saving of the hysteresis is not required, an invalid value is set as the original hysteresis number for the task, and is added to the task table 44.

Since the above process contents regulate the execution of the results obtained by a specific process performed in the past, the number of the hysteresis data for the original process is also added.

When the hysteresis data are added at step S135, therefore, the number of the hysteresis data for the original process must be acquired, and a new task should be added to the task table together with the number.

The hysteresis data storage process performed by the hysteresis data management unit 48 will now be described.

Figure 14:
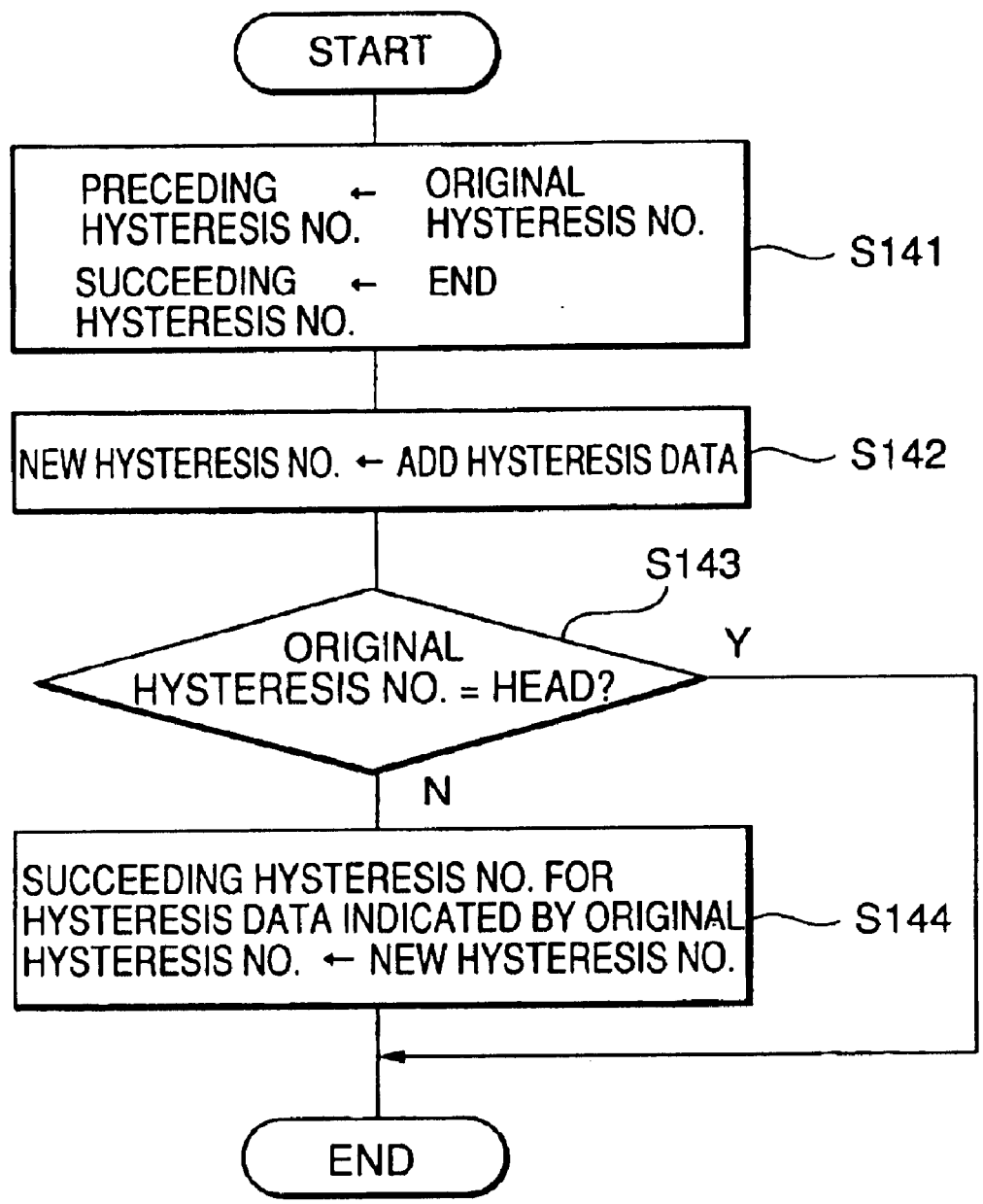
FIG. 14 is a flowchart showing the processing for storing hysteresis data.

FIG. 14 is a flowchart showing the hysteresis data storage process. FIGS. 15A and 15B are diagrams showing input/output data for the hysteresis data storage process.

In the hysteresis storage process performed by the hysteresis data management unit 48 of the information processing apparatus 1, the manipulation, which was performed by a user in the past and which is represented by the hysteresis data, the instructions from another apparatus, and the status change and the process, which are performed by the information processing apparatus 1, are stored in correlation with each other.

In this embodiment, as in the hysteresis data 49 in FIG. 7, a hysteresis number for the hysteresis data for the process, which is a cue for the processing represented by the individual hysteresis, is defined as a pre-hysteresis number. And the hysteresis number for hysteresis data for the process, which is performed in response to the processes represented by the individual hysteresis, is defined as a post-hysteresis number. These numbers are entered in correlation with each other.

In addition to the above described management method, inherent names are provided for the individual processes represented by the hysteresis data, and the names of the processes are stored in correlation with the hysteresis. Also, the information corresponding to the names of the processes is stored, so that complicated management is possible. However, no detailed explanation for this method will be given.

Data entered in the hysteresis data storage process are, as is shown in FIG. 15A, that entered by manipulation by a user with which the process that is to be added as hysteresis data is initiated, an instruction from another apparatus and a status change, on original hysteresis number 1501 to which the process performed by the information processing apparatus 1 is set, and an Action 1502 to which the contents of the actually executed process are set.

For the manipulation performed by the user, the instruction from another apparatus and the status change, and the Action 1502 that represents the action effected by the information processing apparatus 1, there is more detailed information: Actor 1503 representing a person who acts, an Object 1504 representing an object to be processed, an Iobj 1505 representing an object destination for an action, a Reason 1506 representing the reason of an action, a From 1507 representing the source of an action, an Instrl 1508 representing tools and means for an action, a Support 1509 representing a location or an apparatus for an action, and a Time 1510 representing information concerning timing, such as the start, the end and the time period for an action.

The data output in the hysteresis data storage process is a hysteresis number 1511 of the hysteresis data of the process to be added.

The hysteresis data storage process will specifically be explained while referring to the flowchart in FIG. 14.

When the hysteresis data storage process is initiated, at step S141 the original hysteresis number, which is transmitted as input data, is set for the pre-hysteresis number, and the information that represents the end of the related hysteresis data sequence is set for the post-hysteresis number. At step S142 the hysteresis data are added to the hysteresis data 49, and a new hysteresis number is acquired.

At step S143 a check is performed to determine whether the original hysteresis number is the first information in the relating hysteresis data sequence. When the original number is not the first, program control moves to step S144, and when the original number is the first, the processing is thereafter terminated.

Following this, the hysteresis data search process performed by the hysteresis data management unit 48 will be explained.

Figure 16:
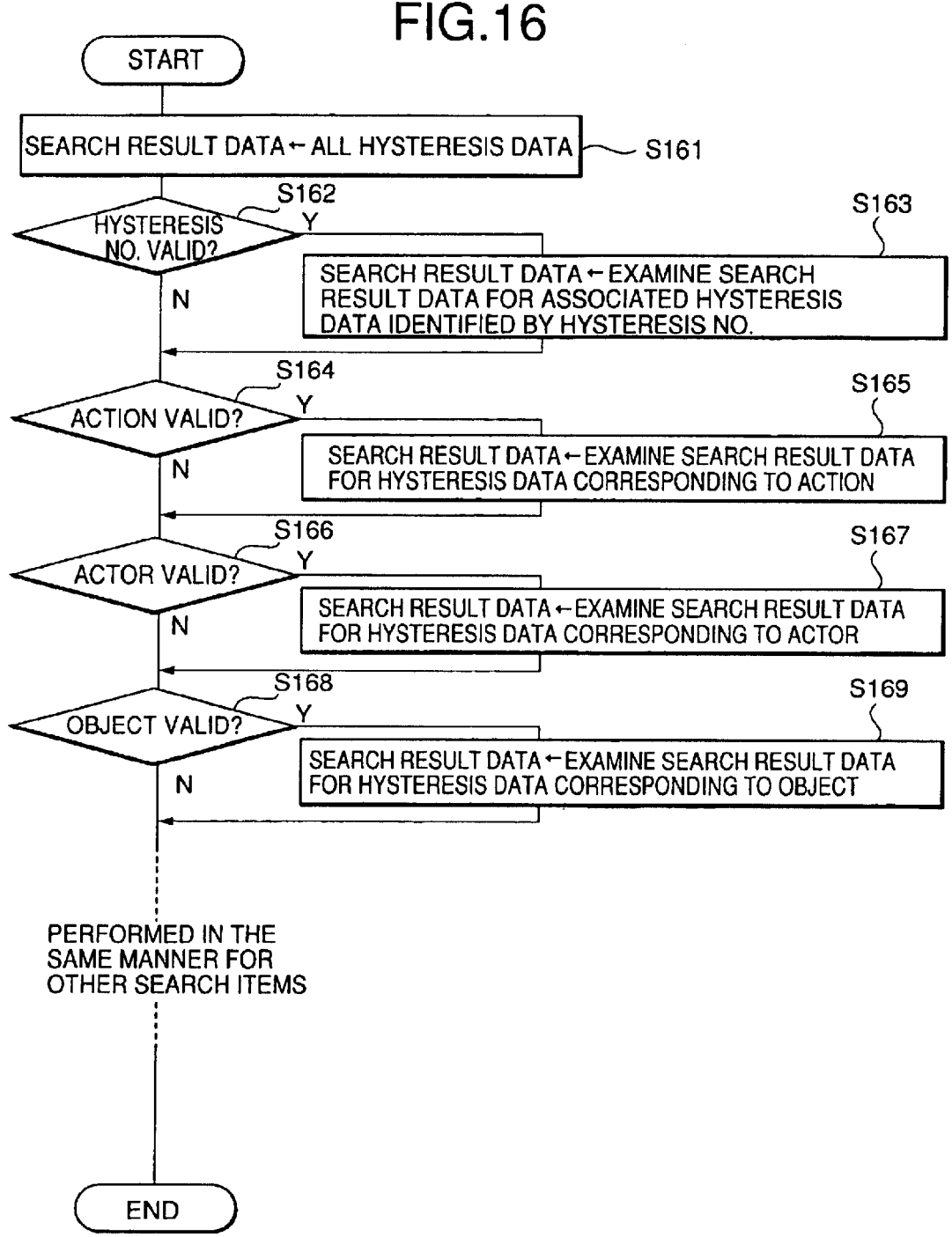
FIG. 16 is a flowchart showing the processing for searching for hysteresis data.

FIG. 16 is a flowchart for the hysteresis data search process, and FIGS. 17A and 17B are diagrams showing input/output data for the hysteresis search process.

In the explanation for the hysteresis search process performed by the hysteresis data management unit 48 of the information processing apparatus 1, all the hysteresis data stored are regarded as search objects, and the process is performed by using the method for determining a search object employing a designated search condition.

The data entered in the hysteresis search process are, as is shown in FIG. 17A, a hysteresis number 1701, which is designated to acquire hysteresis numbers of all the hysteresis data that are correlated with the process indicated by specific hysteresis data; and Action 1702, which is designated for the acquisition of a hysteresis number for hysteresis data that corresponds to the process performed by the information processing apparatus 1.

For data entered by the user, the instruction from another apparatus and the status change, and an Action 1702 that represents the action effected by the information processing apparatus 1, there is more detailed information: an Actor 1703 representing a person who acts, an Object 1704 representing an object to be processed, an Iobj 1705 representing an object destination for an action, a Reason 1706 representing the reason for an action, a From 1707 representing the source of an action, an Instrl 1708 representing tools and means for an action, a Support 1709 representing a location or an apparatus for an action, and a Time 1710 representing information concerning timing, such as the start, the end and the time period for an action.

The data output in the hysteresis data search process is, as is shown in FIG. 17B, search results 1711, including a hysteresis number 1712 for the hysteresis data that is searched for.

The hysteresis search process will be specifically explained while referring to FIG. 16.

When the hysteresis data search process is initiated, at step S161 all the hysteresis data 49 that are stored are set for the search result information in order to regard them as the search objects.

At step S162 the search condition that is received as input data is employed to determine whether the effective hysteresis number has been designated. If the effective hysteresis number has been designated, program control advances to step S163.

At step S163, all the hysteresis data indicated by the search result information are examined. The hysteresis data corresponding to the hysteresis number designated as the input data, and other hysteresis data that are designated by the pre-hysteresis number of the above hysteresis data, are examined until the pre-hysteresis number indicates the head, and all the associated hysteresis data are acquired. Similarly, the hysteresis data are examined until the post-hysteresis number indicates the end, and all the associated hysteresis data are acquired. Then, the search result information is updated.

When, for example, the hysteresis data 49 in FIG. 7 are examined with hysteresis number=9 being designated, hysteresis data for hysteresis number=9 is acquired, and since the pre-hysteresis number of the hysteresis data with hysteresis number=9 is 8, the hysteresis data at hysteresis number=8 is acquired. In addition, since the pre-hysteresis number of the hysteresis data with hysteresis number=8 is 7, the hysteresis data at hysteresis number=7 is acquired. However, since the pre-hysteresis number of the hysteresis data with hysteresis number=7 indicates the head of the associated hysteresis data sequence, data acquisition is no longer performed. The same process is performed for the post-hysteresis number, and hysteresis data with hysteresis number=7 to 11 are stored as the search result information.

At step S164, the search condition designated as the input data is examined to determine whether Action is designated. When the effective Action is designated, program control advances to step S165.

At step S165, all the hysteresis data that are indicated as search objects in the search result information are examined, the hysteresis data that have Actions corresponding to the Action designated as input data are acquired, and the search result information is updated.

When, for example, the hysteresis data 49 in FIG. 7 are examined with Action Print=being designated, the hysteresis data 709 and 711 in which Print is stored in Action are stored as search result information.

To understand the above described embodiment more easily, as is shown by the hysteresis data 49 in FIG. 7, the hysteresis number of the hysteresis data for the process, which is the head of the processes indicated by the individual hysteresis data, is defined as the pre-hysteresis number, while the hysteresis number of the hysteresis data for the final process, which is the end of the processes indicated by the individual hysteresis data, is defined as the post-hysteresis number, and these numbers are correlated. Therefore, the hysteresis data 709 and 711 are detected as different processes. However, even though no detailed explanation will be given, inherent names are provided for the individual processes represented by the hysteresis data, the names of the processes correlating with the hysteresis are stored, and the information for the processes corresponding to their names are also stored, so that the hysteresis data 709 and 711 are detected as different expressions for the same process.

At step S166, similarly, the search condition that is received as input data is examined to determine whether Actor has been designated. When the effective Actor has been designated, program control moves to step S167.

At step S167, as well as the above described processing, all the hysteresis data designated as search objects in the search result information are examined. The hysteresis data corresponding to the Actor designated as the input data are acquired, and the search result information is updated.

At step S168 and the following steps, the same process is performed for elements in addition to the Action, the object to be searched for is determined according to the search conditions that are designated in the input data, and the search result information is returned. The processing is thereafter terminated.

Now, the hysteresis usage process performed by the process execution unit 47 will be described.

Figure 19:
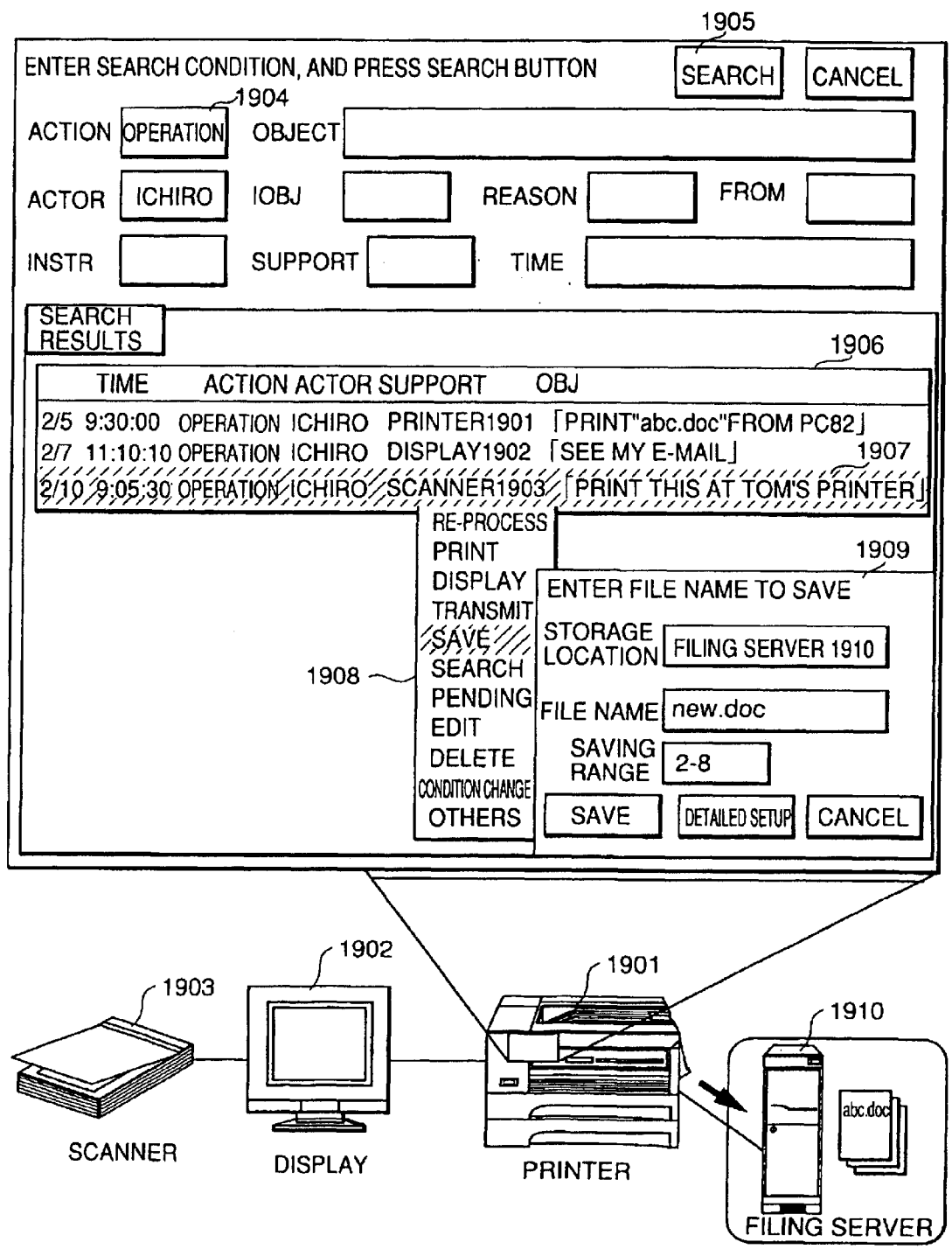
FIG. 19 is a diagram illustrating a display screen for the hysteresis data usage process and a relationship with other, associated information apparatuses.

FIG. 18 is a flowchart showing the hysteresis data usage process, and FIG. 19 is a diagram showing the relationship between the screen displayed in the hysteresis data usage process, and another associated information processing apparatus.

In FIG. 19, a printer 1901, which is an information processing apparatus 1, receives a search instruction from a user; examines the hysteresis stored for itself and the hysteresis for a scanner 2, which is the information processing apparatus 2, a display 1902, and a filing server 1910; and displays the search result on the panel of the printer 1901.

In the hysteresis data usage process performed by the process execution unit 47 of the information processing apparatus 1, the result of the search for the hysteresis data 49 is displayed in accordance with an instruction from a user. When the performance of a specific process is designated relative to the hysteresis data designated by the user, in consonance with the contents of the instructed process, the printer 1901 separates the process that can be completed by only the hysteresis data usage processor, and the process for which a new task is added to the task table 44 and which must be performed outside the hysteresis data usage processor.

The hysteresis data usage process will be specifically described while referring to FIG. 18.

When the hysteresis data usage process is initiated, the display screen in FIG. 19 is displayed, and at step S1801 a check is performed to determine whether the user actually performed any entry manipulation, such as the entry of a character string. If no entry manipulation has occurred, the process at step S1801 is repeated until the entry manipulation by the user is performed.

At step S1802, the entry manipulation performed by the user is analyzed, and at step S1803 program control branches to the process that corresponds to the contents of the entry manipulation. When the user instructs to a search for hysteresis data and the display of the search result, program control advances to step S1804; when the user instructs the performance of a specific process, program control moves to step S1807; and when the user instructs the ending of the hysteresis data usage process, the processing is terminated.

At step S1804, the previously mentioned hysteresis data search process is performed to search for the hysteresis data 49, and at step S1805 search results 1906 are displayed, as is shown in FIG. 19. At step S1806, the manipulation data are added to the hysteresis data in the hysteresis data usage processor. When the hysteresis data in the hysteresis data usage processor is used, the process can be canceled (UNDO) or repeated (REDO). Then, program control returns to step S1801 to accept an instruction from the user.

When, at step S1803, it is ascertained that the performance of a specific process has been instructed, at step S1807 a check is performed to determine whether the instructed process can be completed by only the hysteresis data usage processor.

For example, when a specific process is designated in a selection window 1908 in FIG. 19, it is ascertained that the process for displaying a screen 1909 to further specify the contents of the designated process can be completed by only the hysteresis data usage processor. Program control then moves to step S1808, whereat the process corresponding to the instruction is performed, and program control goes to step S1806.

If, at step S1807, it is determined that the process is to be performed outside the hysteresis data usage processor, program control moves to step S1809. Although not shown in FIG. 18, to avoid a complicated drawing, a check is performed to determine whether the saving of hysteresis data is designated. When the saving of the hysteresis data is designated, the contents of the received task is added to the hysteresis data 49 by the hysteresis data management unit 48 and the hysteresis number is acquired. Since the contents of the task added to the hysteresis data 49 is a cue for the process to be executed later, this task is defined as the head of the hysteresis data sequence.

At step S1810, when the hysteresis data are added at step S1809, the hysteresis number that is returned from the hysteresis data management unit 48 is set to the original hysteresis number for the task, and is added to the task table 44. When, at step S1809, the saving of the hysteresis data is not required, an invalid value is set as the original hysteresis number and is added to the task table 44. The processing is thereafter terminated.

The hysteresis data usage process will be specifically described in detail while referring to FIG. 19.

When the hysteresis data usage process is initiated, the operation display screen shown in FIG. 19 is displayed, and at step S1801, the entry from the user is accepted. When in consonance with the instruction on the screen, the user enters character string "operation" in the input box 1904 to designate search condition Action, at step S1801, the input of the character string is detected, and at step S1802, the entry by the user is analyzed.

As a result, at steps S1803 and S1807, it is ascertained that the process designated by a user can be completed by only the hysteresis data usage processor. At step S1808 the display on the screen is changed, and the variable in the hysteresis data usage processor is updated. At step S1806, information that the character string has been entered is added to the hysteresis data in the hysteresis data usage processor. When the hysteresis data for the hysteresis data usage processor is used, an input error can be corrected easily.

When the search condition is designated by the above operation and the user selects a button 1905 to instruct a search, program control advances to step S1804, whereat the previously described hysteresis data search process is used to examine the hysteresis data 49. At step S1805, the search result 1906 is displayed.

In addition, the user designates specific hysteresis data 1907 from among the displayed search results, and selects one of the processes in the selection window 1908: Re-process, Print, Display, Transmit, Save, Search, Pending, Edit, Delete, Condition change, and Others. When "Others" is selected, another selection window is displayed to select a change of a period of time for saving the hysteresis, a setup change, and an updating of information. In this embodiment, "Save" in the window 1908 is selected. Program control then moves to step S1808, whereat is displayed the designated process operation screen 1909 that corresponds to the selected "Save" process.

On the operation screen 1909, storage location "Filing Server 1910", file name "new.doc" and saving range "2–8" are designated, and the "save" button is selected. Then, when the user instructs the execution of the process, at step S1807 it is determined that the designated process can not be completed by only the hysteresis data usage processor, and program control advances to step S1809. When the saving of the hysteresis data is designated, the contents of the operation are added to the hysteresis data 49 via the hysteresis data management unit 48, while the operation is defined as the head of the hysteresis data sequence. The hysteresis number is also acquired, and is set as the original hysteresis number and is added to the task table 44. The processing is thereafter terminated.

Figure 20:
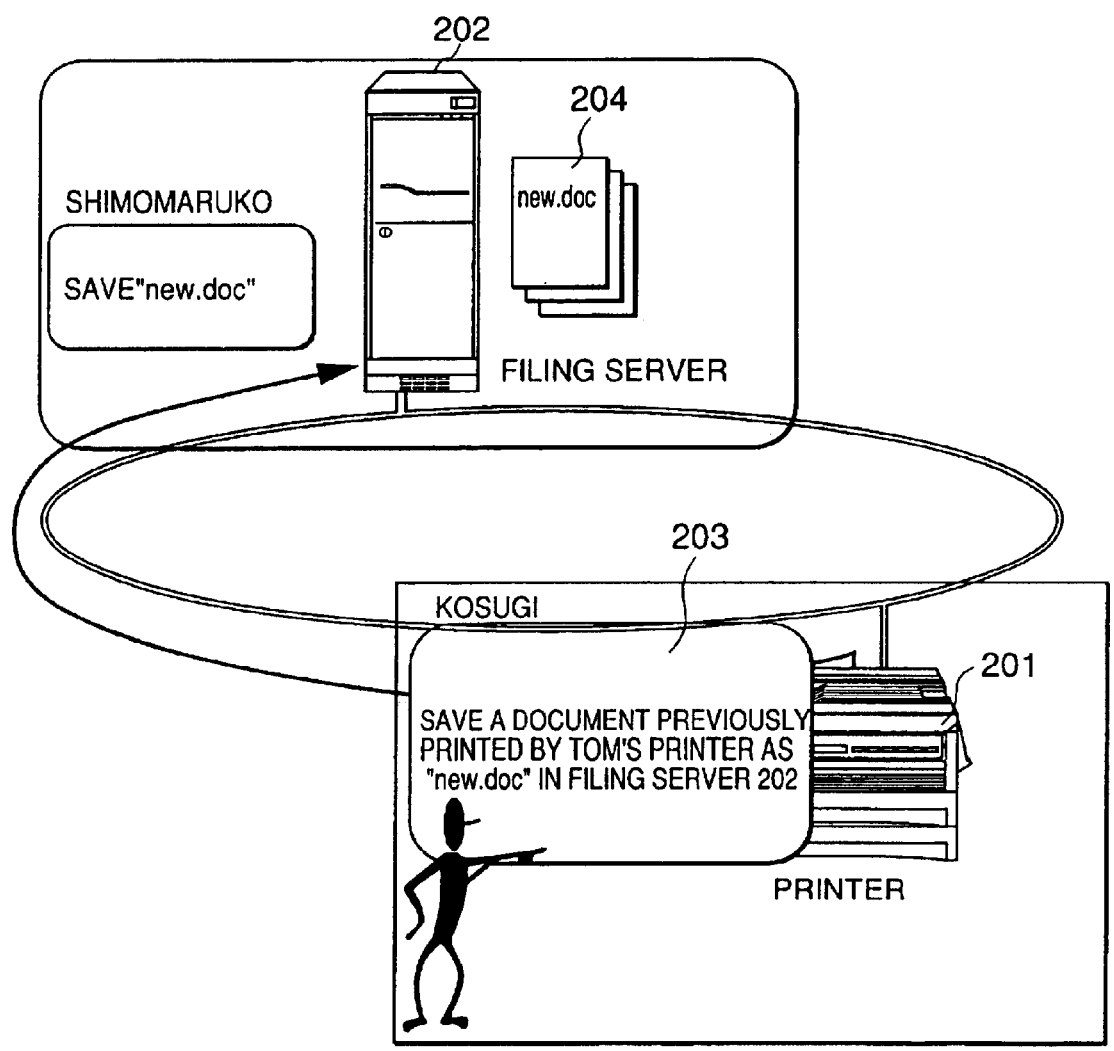
FIG. 20 is a diagram for explaining the hysteresis-data usage process when an operation is instructed by voice.

The hysteresis data usage process upon receipt of an instruction by voice will be specifically described in detail, while referring to FIG. 20.

When a user instructs the printer 201 by voice to "Save a document previously printed by Tom's printer as "new.doc" in Filing Server 202", at step S1801, the input of the voice is detected, and at step S1802 the contents of the instruction are analyzed.

If it is ascertained that the hysteresis data usage processor can not understand the voice instruction, at step S1807 it is ascertained that the process can not be completed by only the hysteresis data usage processor. Thus, program control moves to step S1809. When the saving of hysteresis data is designated, in the hysteresis data management unit 48, the contents of the instruction are added to the hysteresis data 49, while they are defined as the first of the hysteresis data sequences, and the hysteresis number is acquired and is added to the task table 44 as the original hysteresis number. The processing is thereafter terminated.

The added task is performed later, the hysteresis data 49 is searched for, as needed, and the "document previously printed by Tom's printer" is saved as the file name "new.doc" in the filing server 202.

In the above described example, to understand this embodiment, the user employs the hysteresis data 49 via the screen. However, the hysteresis data 49 may be used by a task that is generated by the information processing apparatus 1, without waiting for the receipt of an instruction from the user. The hysteresis data 49 may also be used upon receipt of an instruction from the information processing apparatus 2, which is connected to the information processing apparatus 1 via the network.

For example, in order to update the knowledge base of the planning determination unit 46 of the information processing apparatus 1, the apparatus 1 refers to the hysteresis data 49, including the entry manipulations performed by the user in the past, and analyzes the difference between the processes performed in the past in response to a specific instruction, so that the planning method for a specific instruction can be learned.

According to the instructions from the information processing apparatuses 1 and 2 connected via the network, the hysteresis data 49 for all the information processing apparatuses that are connected to the network can be analyzed at one time.

The present invention can be applied to a system that is constituted by a plurality of devices (e.g., a computer main body, an interface device and a display), or to an apparatus including a single device.

The following is also included within the scope of the present invention: in order to operate various devices to implement functions in the above embodiment, software program code for implementing the functions in the previous embodiments are supplied to a computer in an apparatus, or in a system that is connected to various devices, and in consonance with the program, the computer (or a CPU or an MPU) in the system or the apparatus operates the devices to accomplish the functions in the above embodiments. In this case, the program code read from a memory medium accomplishes the functions of the above described embodiments. And the program code and means for supplying the program code to the computer, e.g., a memory medium on which such program code is recorded, constitute the present invention.

A memory medium for supplying such program code can be, for example, a floppy disk, a hard disk, an optical disk, a magneto optical disk, a CD-ROM, a CD-R, a magnetic tape, a nonvolatile memory card, or a ROM.

In addition, not only for a case where the functions in the previous embodiment can be performed when program code is read and executed by the computer, but also for a case where, according to an instruction in the program code, an OS (Operating System) running on the computer, or another application software program, interacts with the program code to accomplish the functions in the above embodiments, this program code can be included in the embodiments of the present invention.

Furthermore, the present invention includes a case where program code, read from a memory medium, is written in a memory that is mounted on a function expansion board inserted into a computer, or in a function expansion unit connected to a computer, and in consonance with a program code instruction, a CPU mounted on the function expansion board or the function expansion unit performs one part, or all of the actual processing in order to implement the functions in the above described embodiments.

When the present invention is applied for the above memory medium, program code corresponding to the previously described flowcharts is stored in the memory medium.

As is described above, according to the embodiment, since the operation that was performed is stored as hysteresis data together with the associated data, the hysteresis data can be utilized more effectively than when the operation are stored merely as hysteresis data. When, for example, the hysteresis data are used not only for confirmation of the operation performed in the past or the re-performance of the operation, but also employed for another process or operation, so that efficiency in the process and usability can be drastically increased.

Since the operation that was performed is stored as hysteresis data together with a person, timing, a location and an object concerning the performance of processing, the hysteresis data can be easily employed in the succeeding process.

Further, since a series of operations that was performed is stored as hysteresis data with correlation data for each other, the correlation between the operations in the past and their definitions can be easily understood.

In addition, since an object for another process and the hysteresis data are stored with correlation data for each other, the hysteresis data can be easily used in the other processes.

Furthermore, since the storage condition for the hysteresis data can be designated, hysteresis data necessary for each operation can be stored.

Moreover, since not only the hysteresis data of a subject apparatus but also the hysteresis data of another apparatus is employed, the processing efficiency and the usability can be improved. As a result, the effective usage of the hysteresis data is possible in an environment where a plurality of apparatuses are employed, and a user can seamlessly refer to and utilize the hysteresis data stored in each apparatus, without being aware of the difference among the apparatuses.

The hysteresis data can be handled even in response to an operation, an instruction or a process that is not controlled by a PC, and the hysteresis data for an operation, an instruction or a process, for which an input/output device is required, can be stored, so that the usability can be drastically increased.

Since the hysteresis data that should originally be handled by input/output devices can be stored in the corresponding input/output devices, the processing load imposed can be dispersed.

Further, since the hysteresis data that are originally related to input/output devices are managed by the corresponding input/output devices, the completely prepared hysteresis data can be handled.

In addition, since the object for the operation is stored as the hysteresis data, a new process can be performed for the operation object in the past.

Although the present invention has been described in its preferred form with a certain degree of particularity, many apparently widely difference embodiments of the invention can be made without departing from the spirit and the scope thereof. It is to be understood that the invention is not limited to the specific embodiments thereof except as defined in the appended claims.

What is claimed is:

1. An information processing apparatus comprising:
   input means for entering a document;
   first output processing means for printing out on a paper the document entered by said input means as a first output processing operation;
   storage means for storing print hysteresis data, containing a printed document which has been printed by said first output processing means, in correlation with an object in a process other than a process performed by said first output processing means;
   data selection means for selecting one of the hysteresis data from said storage means;
   output processing selection means for selecting one of a plurality of types of output processing which is different from the printing as a second output processing operation; and
   second output processing means for performing the second output processing operation on the printed document contained in the hysteresis data selected by said data selection means.

2. An information processing apparatus according to claim 1, wherein said storage means stores associated information, as well as an operation that was performed as hysteresis data.

3. An information processing apparatus according to claim 2, further comprising analyzation means for analyzing the contents of an operation performed at said input means or by said first processing means, and for acquiring said associated information for said operation.

4. An information processing apparatus according to claim 2, wherein said associated information includes information concerning a person relative to an operation.

5. An information processing apparatus according to claim 4, wherein said information concerning a person includes a person who has issued an instruction or has performed an operation.

6. An information processing apparatus according to claim 2, wherein said associated information includes information concerning time for execution.

7. An information processing apparatus according to claim 2, wherein said associated information includes information concerning a location for execution.

8. An information processing apparatus according to claim 2, wherein said associated information includes information concerning an apparatus for execution.

9. An information processing apparatus according to claim 2, wherein said associated information includes associated hysteresis information to correlate with hysteresis information for another associated operation.

10. An information processing apparatus according to claim 9, wherein said associated hysteresis information is used to store hysteresis data for a series of operations correlated with each other.

11. An information processing apparatus according to claim 9, wherein said associated hysteresis information includes information to correlate with hysteresis information for preceding and succeeding operations of said series of operations.

12. An information processing apparatus according to claim 1, wherein said input means includes operation entry means manipulated by a user.

13. An information processing apparatus according to claim 1, wherein said input means includes reception means for receiving an instruction or information from an external device.

14. An information processing apparatus according to claim 13, wherein said instruction includes an instruction from a user for an external device.

15. An information processing apparatus according to claim 1, wherein said input means includes detection means for detecting a status.

16. An information processing apparatus according to claim 1, wherein said input means includes reading means for reading and inputting image data.

17. An information processing apparatus according to claim 1, wherein said object includes one of file data, schedule data, information that is pending to be processed, information managed by a database, information extracted from specific information, mail information, and device management information.

18. An information processing apparatus according to claim 1, further comprising designation means for designating a condition with which said storage means stores said hysteresis data.

19. An information processing apparatus according to claim 18, wherein said designation means determines for each operation whether or not said hysteresis data are to be stored.

20. An information processing apparatus according to claim 18, wherein said designation means determines for each operation whether or not an object to be processed is to be stored.

21. An information processing apparatus according to claim 18, wherein said designation means designates a person who is permitted to refer to said hysteresis data.

22. An information processing apparatus according to claim 1, further comprising control means for controlling said process performed by said first processing means based on said hysteresis data stored in said storage means.

23. An information processing apparatus according to claim 22, wherein said control means controls performance or cancellation of said process performed by said first processing means.

24. An information processing apparatus according to claim 1, wherein said second output processing operation performed by said second output processing means is an output of an instruction to another apparatus to execute a predetermined process on the printed information.

25. An information processing apparatus according to claim 1, wherein said second output processing operation performed by said second processing means includes one of printing, displaying, transmitting, and saving.

26. An information processing apparatus according to claim 1, wherein said storage means stores hysteresis data in correlation with an object to be processed by said second processing means.

27. An information processing apparatus according to claim 1, wherein the selection performed by said data selection means includes a search for hysteresis data.

28. An information processing apparatus according to claim 27, wherein the selection performed by said data selection means includes display of a list of hysteresis data that are searched for and a selection of one of the hysteresis data in the list.

29. An information processing apparatus according to claim 1, wherein the selection performed by said data selection means includes display of a list of hysteresis data that are stored in said storage means.

30. An information processing apparatus according to claim 29, wherein the selection performed by said data selection means includes a process for selecting specific hysteresis data from said list of hysteresis data.

31. An information processing apparatus according to claim 1, further comprising a plurality of function units, wherein hysteresis of an operation that is completed within a specific function unit is stored independently of hysteresis stored in said storage means.

32. An information processing apparatus according to claim 1, further comprising acquisition means for acquiring hysteresis data for another apparatus, wherein said second processing means employs said hysteresis data obtained by said acquisition means and said hysteresis data stored in said storage means to perform a process.

33. An information processing apparatus according to claim 32, wherein said second processing means displays said hysteresis data for another apparatus, which are obtained by said acquisition means, and said hysteresis data of said information processing apparatus, which are stored in said storage means.

34. An information processing method comprising:
   an input step of entering a document;
   a first output processing step of printing out on a paper the document entered at said input step as a first output processing operation;
   a storage step of storing print hysteresis data, containing a printed document which has been printed at said first output processing step, in correlation with an object in a process other than a process performed at said first output processing step;
   a data selection step of selecting one of the hysteresis data stored at said storage step;
   an output processing selection step of selecting one of a plurality of types of output processing which is different from the printing as a second output processing operation; and
   a second output processing step of performing the second output processing operation on the printed document contained in the hysteresis data selected at said data selection step.

35. An information processing method according to claim 34, wherein at said storage step associated information is stored as well as an operation that was performed as hysteresis data.

36. An information processing method according to claim 35, further comprising an analyzation step of analyzing the contents of an operation performed at said input step or at said first processing step, and of acquiring said associated information for said operation.

37. An information processing method according to claim 35, wherein said associated information includes information concerning time for execution.

38. An information processing method according to claim 35, wherein said associated information includes information concerning a location for execution.

39. An information processing method according to claim 35, wherein said associated information includes information concerning an apparatus for execution.

40. An information processing method according to claim 35, wherein said associated information includes associated hysteresis information to correlate with hysteresis information for another associated operation.

41. An information processing method according to claim 40, wherein said associated hysteresis information is used to store hysteresis data for a series of operations correlated with each other.

42. An information processing method according to claim 40, wherein said associated hysteresis information includes information to correlate with hysteresis information for preceding and succeeding operations of said series of operations.

43. An information processing method according to claim 34, wherein said input step includes an operation entry step manipulated by a user.

44. An information processing method according to claim 34, wherein said input step includes a reception step of receiving an instruction or information from an external device.

45. An information processing method according to claim 44, wherein said instruction includes an instruction from a user for an external device.

46. An information processing method according to claim 34, wherein said input step includes a detection step of detecting a status.

47. An information processing method according to claim 34, wherein said associated information includes information concerning a person relative to an operation.

48. An information processing method according to claim 47, wherein said information concerning a person includes a person who has issued an instruction or has performed an operation.

49. An information processing method according to claim 34, wherein said input step includes a reading step of reading and inputting image data.

50. An information processing method according to claim 34, wherein said object includes one of file data, schedule data, information that is pending to be processed, information managed by a database, information extracted from specific information, mail information, and device management information.

51. An information processing method according to claim 34, further comprising a designation step of designating a condition with which said hysteresis data are stored at said storage means.

52. An information processing method according to claim 51, wherein, at said designation step, whether said hysteresis data are to be stored is determined for each operation.

53. An information processing method according to claim 51, wherein at said designation step, whether a substance of an object to be processed is to be stored is determined for each operation.

54. An information processing method according to claim 51, wherein a person who is permitted to refer to said hysteresis data is designated at said designation step.

55. An information processing method according to claim 34, further comprising a control step of controlling said process performed at said first processing step based on said hysteresis data stored at said storage step.

56. An information processing method according to claim 55, wherein re-performance or cancellation of said process performed at said first processing step is controlled at said control step.

57. An information processing method according to claim 34, wherein said second output processing operation performed at said second processing step is an output of an instruction to another apparatus to execute a predetermined process on the printed information.

58. An information processing method according to claim 34, wherein said second output processing operation performed at said second processing step includes one of printing, displaying, transmitting, and saving.

59. An information processing method according to claim 34, wherein, at said storage step, hysteresis data is stored in correlation with an object to be processed at said second processing step.

60. An information processing apparatus according to claim 34, wherein the selection performed at said data selection step includes a search for hysteresis data.

61. An information processing method according to claim 60, wherein the selection performed at said data selection step includes display of a list of hysteresis data that are searched for and a selection of one of the hysteresis data in the list.

62. An information processing method according to claim 34, wherein the selection performed at said data selection step includes display of a list of hysteresis data that are stored at said storage step.

63. An information processing method according to claim 34, wherein the selection performed at said data selection step includes a process for selecting specific hysteresis data from said list of hysteresis data.

64. An information processing method according to claim 34, further comprising a plurality of function steps, wherein hysteresis of an operation that is completed only at a specific function step is stored independently of hysteresis stored at said storage step.

65. An information processing method according to claim 34, further comprising an acquisition step of acquiring hysteresis data for another apparatus, wherein a process at said second processing step is performed by employing said hysteresis data obtained at said acquisition step and said hysteresis data stored at said storage step.

66. An information processing method according to claim 34, wherein, at said second processing step, displayed are said hysteresis data for another apparatus, which are obtained by said acquisition means, and said hysteresis data of a subject information processing apparatus, which are stored at said storage step.

67. A computer-readable storage medium on which is stored an information processing program for permitting a computer to perform information processing, said program comprising codes for causing said computer to perform:

an input step of entering a document;

a first output processing step of printing out on a paper the document entered at said input step as a first output processing operation;

a storage step of storing the print hysteresis data, containing a printed document which has been printed at said first output processing step, in correlation with an object in a process other than a process performed at said first output processing step;

a data selection step of selecting one of the hysteresis data stored at said storage step;

an output processing selection step of selecting one of a plurality of types of output processing which is different from the printing as a second output processing operation; and a second output processing step of performing the second output processing operation on the printed document contained in the hysteresis data selected at said data selection step.

* * * * *

UNITED STATES PATENT AND TRADEMARK OFFICE
CERTIFICATE OF CORRECTION

PATENT NO. : 6,925,600 B2  Page 1 of 1
DATED : August 2, 2005
INVENTOR(S) : Masanori Wakai et al.

It is certified that error appears in the above-identified patent and that said Letters Patent is hereby corrected as shown below:

Title page,
Item [56], References Cited, OTHER PUBLICATIONS,
"S. Kochan, et al," reference "347" should read -- 347 (1990) --.

Drawings,
Figure 9, Item S901, "PRO" should read -- PRO- --.

Column 2,
Line 17, "sever" should read -- server --.

Column 20,
Line 23, "difference" should read -- different --.

Signed and Sealed this

Eleventh Day of April, 2006

JON W. DUDAS
*Director of the United States Patent and Trademark Office*